(12) United States Patent
Thomas et al.

(10) Patent No.: US 12,443,748 B2
(45) Date of Patent: Oct. 14, 2025

(54) SYSTEMS AND METHODS FOR EFFICIENT REPORTING OF HISTORICAL SECURITY AWARENESS DATA

(71) Applicant: KnowBe4, Inc., Clearwater, FL (US)

(72) Inventors: Sunil Mathew Thomas, Cape Town (ZA); Peter John Hayward, Cape Town (ZA); Phillip Samuel Rosochacki, Cape Town (ZA); Raymond Skinner, Dunedin, FL (US); Mark William Patton, Clear Water, FL (US)

(73) Assignee: KnowBe4, Inc., FL (US)

( * ) Notice: Subject to any disclaimer, the term of this patent is extended or adjusted under 35 U.S.C. 154(b) by 160 days.

(21) Appl. No.: 18/509,029

(22) Filed: Nov. 14, 2023

(65) Prior Publication Data
US 2024/0160782 A1    May 16, 2024

Related U.S. Application Data

(60) Provisional application No. 63/425,362, filed on Nov. 15, 2022.

(51) Int. Cl.
*G06F 21/62* (2013.01)

(52) U.S. Cl.
CPC ...... *G06F 21/6245* (2013.01); *G06F 21/6227* (2013.01); *G06F 21/6254* (2013.01); *H04L 2209/42* (2013.01)

(58) Field of Classification Search
CPC ............. G06F 21/6245; G06F 21/6227; G06F 21/6254; H04L 2209/42
See application file for complete search history.

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,003,542 B1 * | 4/2015 | MacKay ................. G06F 21/50 726/26 |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |

(Continued)

FOREIGN PATENT DOCUMENTS

| | | |
|---|---|---|
| EP | 3 582 468 A1 | 12/2019 |
| WO | WO-2016/164844 A1 | 10/2016 |

*Primary Examiner* — Robert B Leung
(74) *Attorney, Agent, or Firm* — Foley & Lardner LLP

(57) ABSTRACT

The present disclosure describes systems and methods for efficient reporting of data which includes personally identifiable information (PII) and which is collected and processed by a security awareness system. The data may be stored in a data storage system. The data may include a time stamp and queries of an historical nature may be supported. In the event that PII is removed from the data storage system, then the removal may propagate through all aspects of the data storage system, including the historical data.

20 Claims, 15 Drawing Sheets

(56) References Cited

U.S. PATENT DOCUMENTS

| | | |
|---|---|---|
| 9,591,017 B1 | 3/2017 | Higbee et al. |
| 9,667,645 B1 | 5/2017 | Belani et al. |
| 9,912,687 B1 | 3/2018 | Wescoe et al. |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 2016/0164898 A1 | 6/2016 | Belani et al. |
| 2016/0301705 A1 | 10/2016 | Higbee et al. |
| 2018/0232488 A1* | 8/2018 | Jafer .................... G06F 21/6254 |
| 2018/0307857 A1* | 10/2018 | Beecham ............ G06F 16/9024 |
| 2019/0173819 A1 | 6/2019 | Wescoe et al. |
| 2019/0245885 A1 | 8/2019 | Starink et al. |
| 2020/0311260 A1 | 10/2020 | Klonowski et al. |
| 2021/0185075 A1 | 6/2021 | Adams |
| 2021/0194924 A1 | 6/2021 | Heinemeyer et al. |
| 2021/0334402 A1* | 10/2021 | Detchemendy ....... H04L 63/108 |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

\* cited by examiner

SYSTEMS AND METHODS FOR EFFICIENT REPORTING OF HISTORICAL SECURITY AWARENESS DATA

This application claims the benefit of and priority to U.S. Provisional Application No. 63/425,362, titled SYSTEMS AND METHODS FOR EFFICIENT REPORTING OF HISTORICAL SECURITY AWARENESS DATA" and filed on Nov. 15, 2022, which is incorporated herein in its entirety for all purposes.

This disclosure relates to security awareness management. In particular, the present disclosure relates to systems and methods for efficient reporting of historical security awareness data that includes personally identifiable information (PII).

BACKGROUND OF THE DISCLOSURE

Cybersecurity incidents cost companies millions of dollars each year in actual costs and can cause customers to lose trust in an organization. The incidents of cybersecurity attacks and the costs of mitigating the damage is increasing every year. Many organizations use cybersecurity tools such as antivirus, anti-ransomware, anti-phishing, and other quarantine platforms to detect and intercept known cybersecurity attacks. However, new, and unknown security threats involving social engineering may not be readily detectable by such cyber security tools, and the organizations may have to rely on their employees (also referred to as users) to recognize such threats. To enable their users to stop or reduce the rate of cybersecurity incidents, organizations may conduct security awareness training for their users. The organizations may conduct security awareness training through in-house cybersecurity teams or may use third-parties which are experts in matters of cybersecurity. The security awareness training may include cybersecurity awareness training, for example, via simulated phishing attacks, computer-based training, and such training programs. Through security awareness training, organizations educate their users on how to detect and report suspected phishing communication, avoid clicking on malicious links, and use applications and websites safely.

BRIEF SUMMARY OF THE DISCLOSURE

Systems and methods are provided for efficiently storing and removing personally identifiable information (PII) in a data storage system. In an example embodiment, a method for more efficiently storing and removing PII in a data storage system is described. The method includes receiving a request to store data to one or more data records in the data storage system, the data comprising one or more data items of PII of a user, joined PII, and non-PII. In some embodiments, the method includes storing the one or more PII data items, the one or more joined PII data items, and the one or more non-PII data items to a data record of the one or more data records. Further, in some embodiments, the method includes identifying that the data record has the one or more PII, one or more joined PII or one or more non-PII data items within the data and generating a PII user identifier for the user. In some embodiments, the method includes replacing in the data record the one or more PII data items with a first set of links to the one or more PII data items stored in a PII data table in association with the PII user identifier and the one or more joined PII data items with a second set of links to the one or more joined PII data items stored in a joined PII data table in association with the PII user identifier. In some embodiments, the method includes receiving a second request to remove PII associated with the user and replacing at least the one or more PII data items in the PII data table with a value indicating the PII data item has been removed. Further, in some embodiments, the method includes validating that removal of the PII associated with the user has occurred throughout the data storage system and providing, responsive to validating, a report that the PII associated with the user has been removed.

In some embodiments, the PII data table and the joined PII data table are included in a single table associated with the PII user identifier.

In some embodiments, the method further includes replacing, responsive to the second request, the one or more joined PII data items in the joined PII data table with the value indicating that the one or more joined PII data item has been removed.

In some embodiments, the method further includes storing the one or more PII data items in the PII data table in association with the PII user identifier.

In some embodiments, the method further includes storing the one or more joined PII data items in the joined PII data table in association with the PII user identifier.

In some embodiments, the one or more joined PII data items are data items which in combination with other data items become PII.

In some embodiments, the data storage system comprises a data lake.

In some embodiments, the value comprises a string that identifies details of the removal of the PII.

In some embodiments, the method further includes creating an intermediate data record to store one of a copy of the one or more PII data items or the first set of links to the one or more PII data items and one of a copy of the one or more joined PII data items or the second set of links to the one or more joined PII data items.

In some embodiments, the method further includes removing, responsive to the second request, the copy of the one or more PII data items and the copy of the one or more joined PII data items from the intermediate data record.

In another example embodiment, a system for more efficiently storing and removing personally identifiable information (PII) in a data storage system is described. The system includes one or more devices configured to receive a request to store data to one or more data records in a data storage system, the data comprising one or more data items of PII of a user, joined PII, and non-PII. In some embodiments, the one or more devices are configured to store the one or more PII data items, the one or more joined PII data items, or the one or more non-PII data items to a data record of the one or more data records. In some embodiments, the one or more devices are configured to cause an agent to determine that the data record has the one or more PII, one or more joined PII or one or more non-PII data items within the data and generate a PII user identifier for the user. Further, in some embodiments, the one or more devices are configured to replace in the data record the one or more PII data items with a first set of links to the one or more PII data items stored in a PII data table in association with the PII user identifier and the one or more joined PII data items with a second set of links to the one or more joined PII data items stored in a joined PII data table in association with the PII user identifier. In some embodiments, the one or more devices are configured to receive a second request to remove PII associated with the user and replace at least the one or more PII data items in the PII data table with a value indicating the PII data item has been removed. Further, in some embodiments, the one or more devices are configured to validate that removal of the PII associated with the user has occurred throughout the data storage system and provide a report that the PII associated with the user has been removed.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods that are useful for efficient reporting of historical security awareness data that includes personally identifiable information (PII).

A. Computing and Network Environment

Figure 1A:
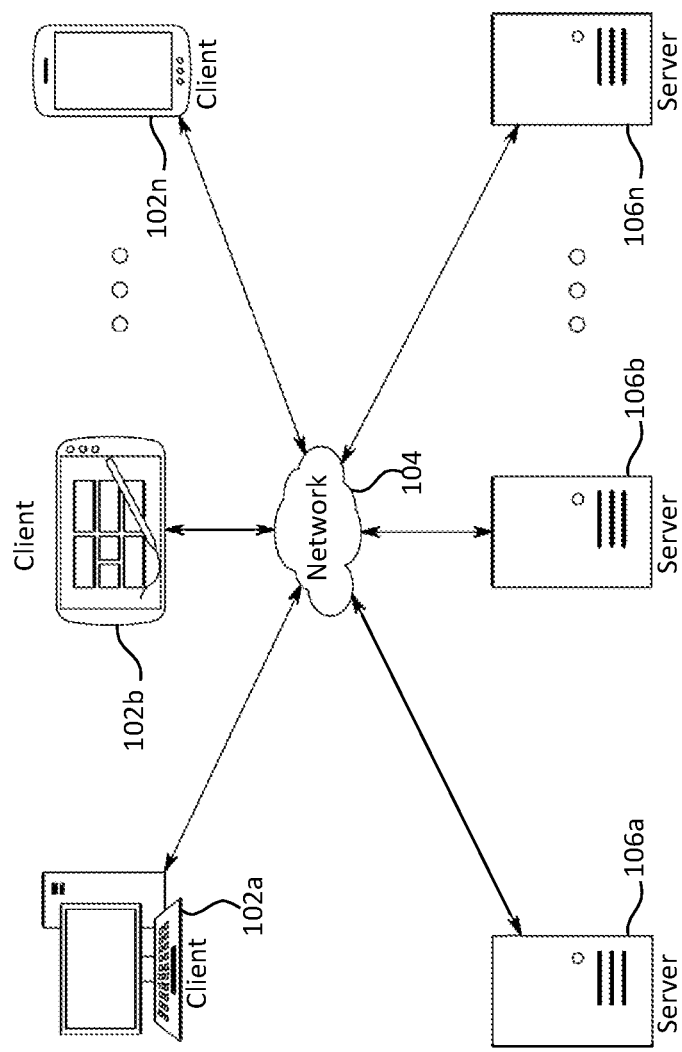
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel, or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UNITS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g., Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the Internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP Internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems, and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
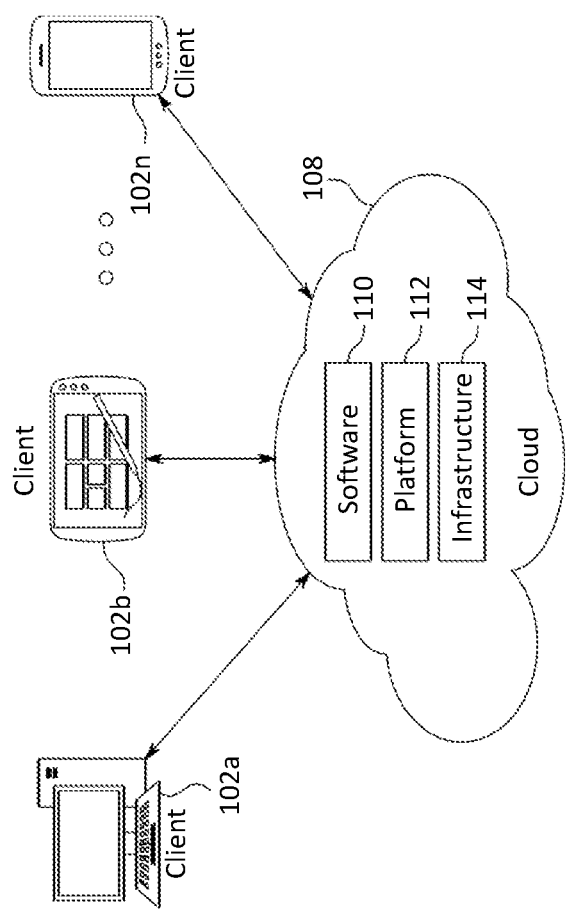
FIG. 1B is a block diagram depicting a could computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud-based delivery, e.g., Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers, or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers, or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g., Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
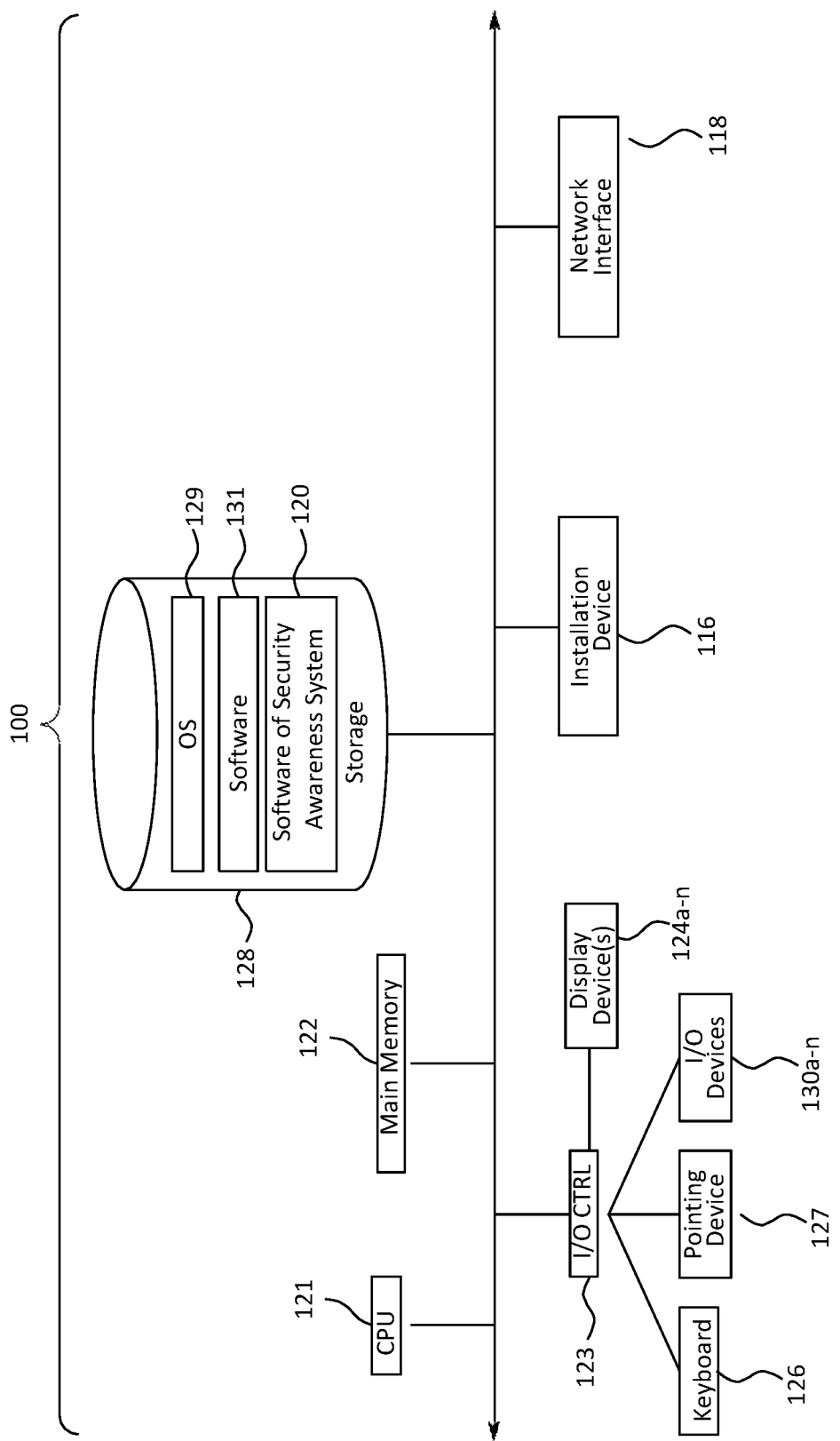
FIGS. 1C and 1D are block diagrams depicting embodiments of computing devices useful in connection with the methods and systems described herein.
Figure 1D:
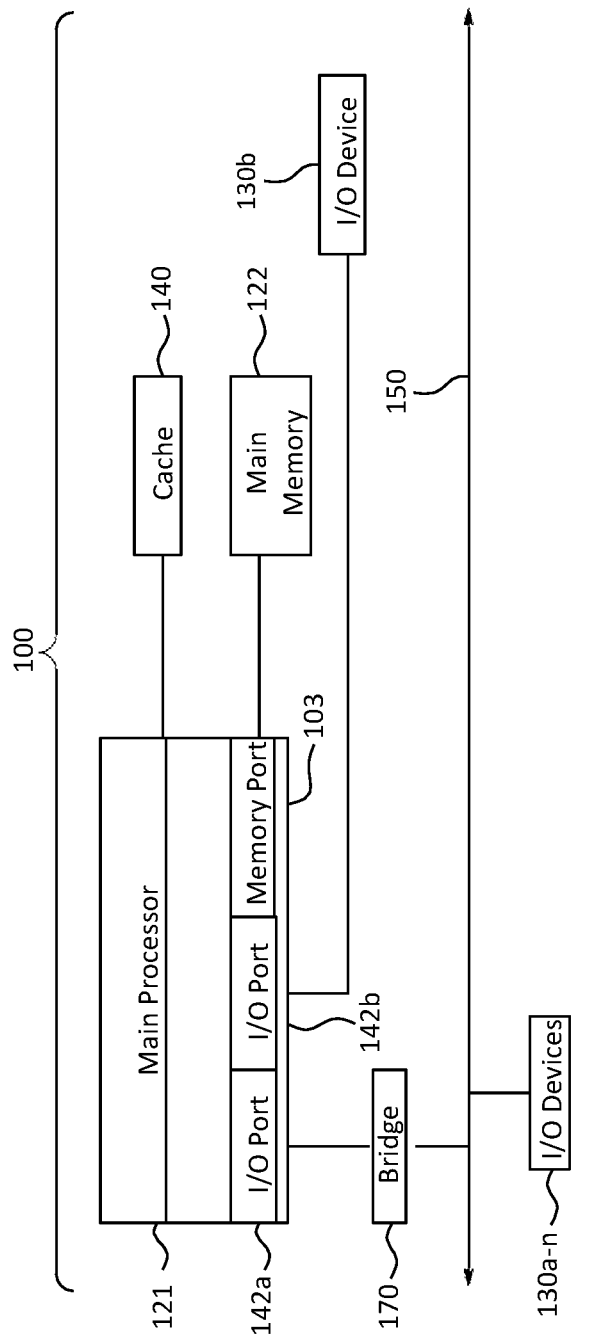

FIG. 1C and FIG. 1D depict block diagrams of a computing device 100 useful for practicing an embodiment of the client 102 or a server 106. As shown in FIG. 1C and FIG. 1D, each computing device 100 includes a central processing unit (CPU) 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and software of security awareness system 120. As shown in FIG. 1D, each computing device 100 may also include additional optional elements, e.g., a memory port 103, a bridge 170, one or more input/output (I/O) devices 130a-130n (generally referred to using reference numeral 130), and a cache memory 140 in communication with the central processing unit 121.

The central processing unit 121 is any logic circuity that responds to, and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by central processing unit 121. Main memory unit 122 may be volatile and faster than storage 128 memory. Main memory units 122 may be Dynamic Random-Access Memory (DRAM) or any variants, including Static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile Random Access Memory (NVRAM), flash memory, non-volatile static RAM (nvSRAM), Ferroelectric RAM (FeRAM), Magnetoresistive RAM (MRAM), Phase-change RAM (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, central processing unit 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which central processing unit 121 communicates directly with cache memory 140 via a secondary bus, sometimes referred to as a backside bus. In other embodiments, central processing unit 121 communicates with cache memory 140 using the system bus 150. Cache memory 140 typically has a faster response time than main memory 122 and is typically provided by SRAM, BSRAM, or EDRAM. In the embodiment shown in FIG. 1D, tcentral processing unit 121 communicates with various I/O devices 130 via a local system bus 150. Various buses may be used to connect central processing unit 121 to any of the I/O devices 130, including a PCI bus, a PCI-X bus, a PCI-Express bus, or a NuBus. For embodiments in which the I/O device is a video display 124, central processing unit 121 may use an Advanced Graphic Port (AGP) to communicate with the display 124 or the I/O controller 123 for the display 124. FIG. 1D depicts an embodiment of a computer 100 in which central processing unit 121 communicates directly with I/O device 130*b* or other central processing units 121' via HYPERTRANSPORT, RAPIDIO, or INFINIBAND communications technology. FIG. 1D also depicts an embodiment in which local busses and direct communication are mixed: central processing unit 121 communicates with I/O device 130*a* using a local interconnect bus while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple iPhone. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provide for voice recognition and inputs, including, e.g., Microsoft KINECT, SIRI for iPhone by Apple, Google Now or Google Voice Search, and Alexa by Amazon.

Additional devices 130*a*-130*n* have both input and output capabilities, including, e.g., haptic feedback devices, touchscreen displays, or multi-touch displays. Touchscreen displays, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices 130*a*-130*n* may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation device 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode (LED) displays, digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect, or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments, software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One of ordinarily skill in the art will recognize and appreciate the various ways and embodiments that a computing device 100 may be configured to have multiple display devices 124*a*-124*n*.

Referring again to FIG. 1C, the computing device 100 may comprise storage device 128 (e.g., one or more hard disk drives or redundant arrays of independent disks) for storing an operating system or other related software, and for storing application software programs such as any program related to the software of security awareness system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices 128 may include multiple volatile and non-volatile memories, including, e.g., solid state hybrid drives that combine hard disks with solid state cache. Some storage devices 128 may be non-volatile, mutable, or read-only.

Some storage devices 128 may be internal and connect to the computing device 100 via a bus 150. Some storage devices 128 may be external and connect to the computing device 100 via a I/O device 130 that provides an external bus. Some storage devices 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage devices 128 may also be used as an installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.1 la/b/g/n/ac CDMA, GSM, WiMAX, and direct asynchronous connections). In one embodiment, the computing device 100 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem, or any other device suitable for interfacing the computing device 100 to any type of network capable of communication and performing the operations described herein.

A computing device 100 of the sort depicted in FIG. 1B and FIG. 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the iPod Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple lossless audio file formats and .mov, .m4v, and .mp4 MPEG-4 (H.264/MPEG-4 AVC) video file formats.

In some embodiments, the computing device 100 is a tablet e.g., the iPAD line of devices by Apple; GALAXY TAB family of devices by Samsung; or KINDLE FIRE, by Amazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g., a smartphone combined with a digital audio player or portable media player. For example, one of these embodiments is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems And Methods for Efficient Reporting of Historical Security Awareness Data This disclosure relates to security awareness management. In particular, the present disclosure relates to systems and methods for efficient reporting of historical security awareness data that includes personally identifiable information (PII).

Cybersecurity incidents cost companies millions of dollars each year in actual costs and can cause customers to lose trust in an organization. The incidents of cybersecurity attacks and the costs of mitigating the damage is increasing every year. Many organizations use cybersecurity tools such as antivirus, anti-ransomware, anti-phishing, and other quarantine platforms to detect and intercept known cybersecurity attacks. However, new and unknown security threats involving social engineering may not be readily detectable by such cyber security tools, and the organizations may have to rely on their employees (also referred to as users) to recognize such threats. To enable their users to stop or reduce the rate of cybersecurity incidents, organizations may conduct security awareness training for their users. The organizations may conduct security awareness training through in-house cybersecurity teams or may use third-parties who are experts in matters of cybersecurity. The security awareness training may include cybersecurity awareness training, for example, via simulated phishing attacks, computer-based training, and such training programs. Through security awareness training, organizations educate their users on how to detect and report suspected phishing communication, avoid clicking on malicious links, and use applications and websites safely.

A security breach is a cybersecurity incident where information is taken from an organization or an individual by malicious actors without authorization from the organization or individual. The information stored by the organization and that may be taken in the security breach may include sensitive data such as personally identifiable information (PII) and credentials. The Office of Privacy and Open Government of the U.S. Department of Commerce defines the term personally identifiable information (PII) as one that "refers to information which can be used to distinguish or trace an individual's identity, such as their name, social security number, biometric records, etc. alone, or when combined with other personal or identifying information which is linked or linkable to a specific individual, such as date and place of birth, mother's maiden name, etc."

A security awareness system may process data acquired by the security awareness system relating to users of an organization and their actions in relation to cybersecurity threats. Examples of cybersecurity threats may include a phishing email or an executable macro in a received spreadsheet or word processed document. In some examples, cybersecurity threats may be created by the security awareness system to test and train users of the organization. Examples of such cybersecurity threats created by the security awareness system include a simulated phishing communication. During the course of normal operation of the security awareness system, data is gathered and created and this data may be PII to a user (for example, email address and job title of a user who responded to a simulated phishing communication). Other data acquired by the security awareness system may be non-PII, and may include a response to cybersecurity threats by the security awareness system such as training provided or reporting within the organization. A system administrator of the security awareness system in an organization may receive information stored by the security awareness system by means of reports and queries, and may receive trends in information over time which may require historical data to be stored, accessed, and processed.

Increasingly, the organizations that acquire and store data that relate to its user and client organizations must abide to regulations governing data protection and privacy (for example, general data protection regulation (GDPR) in the European Union (EU)). As a part of those regulations, a user may request that PII held by the organization be deleted. Traditionally, data associated with a security awareness system may be stored in a database or a data warehouse. These technologies impose considerable structure on the stored data which, whilst beneficial, can result in performance issues when the data is processed by the security awareness system, or any other system that processes the data stored in the database or data warehouse. In an example, a query which generates a report over all users in all organizations takes such a time to run that it cannot be processed in the time available before the next iteration of the report is required. In some examples, a query which is designed to present data to a system administrator in an inter-active fashion runs so slowly that the system administrator cannot use the tool to gain insights to the organization's security awareness.

Furthermore, data associated with the security awareness system may allow a user to be identified uniquely and the user may have a right to request that his/her PII be removed. Removal of all data associated with the user (i.e., including non-personal data) may compromise metrics, trends, and other information derived from the non-personal data and there may be no obligation to remove this non-personal data.

A solution to the time taken to generate reports from the security awareness system may be to implement a data lake to store the data associated with a security awareness system. A data lake is a data storage solution which manages large amounts of data in a raw or relatively raw (i.e., unstructured) format. A data lake may be considered a repository for large amounts of data and the data lake may evolve over time to support a change to the structure of data which is stored. Among the benefits of a data lake is speed of data processing and manipulation: In an example, a query to a data lake can be much quicker than a comparable query to a data warehouse. However, this approach makes the management of PII difficult and especially the historical management of PII since the loose structure of a data lake does not enforce partitioning of data. A means to remove PII from a data lake in line with regulations governing data protection and privacy, and a technique that allows the implementation of highly-efficient querying and that maintains the robust reporting of data and historical data is needed.

The present disclosure describes systems and methods for efficient reporting of data which includes personally identifiable information (PII) and which is collected and processed by a security awareness system. The data may be stored in a data storage system. The data may include a time stamp and queries of an historical nature may be supported. In the event that PII is removed from the data storage system, then the removal may propagate through all aspects of the data storage system, including the historical data.

Figure 2:
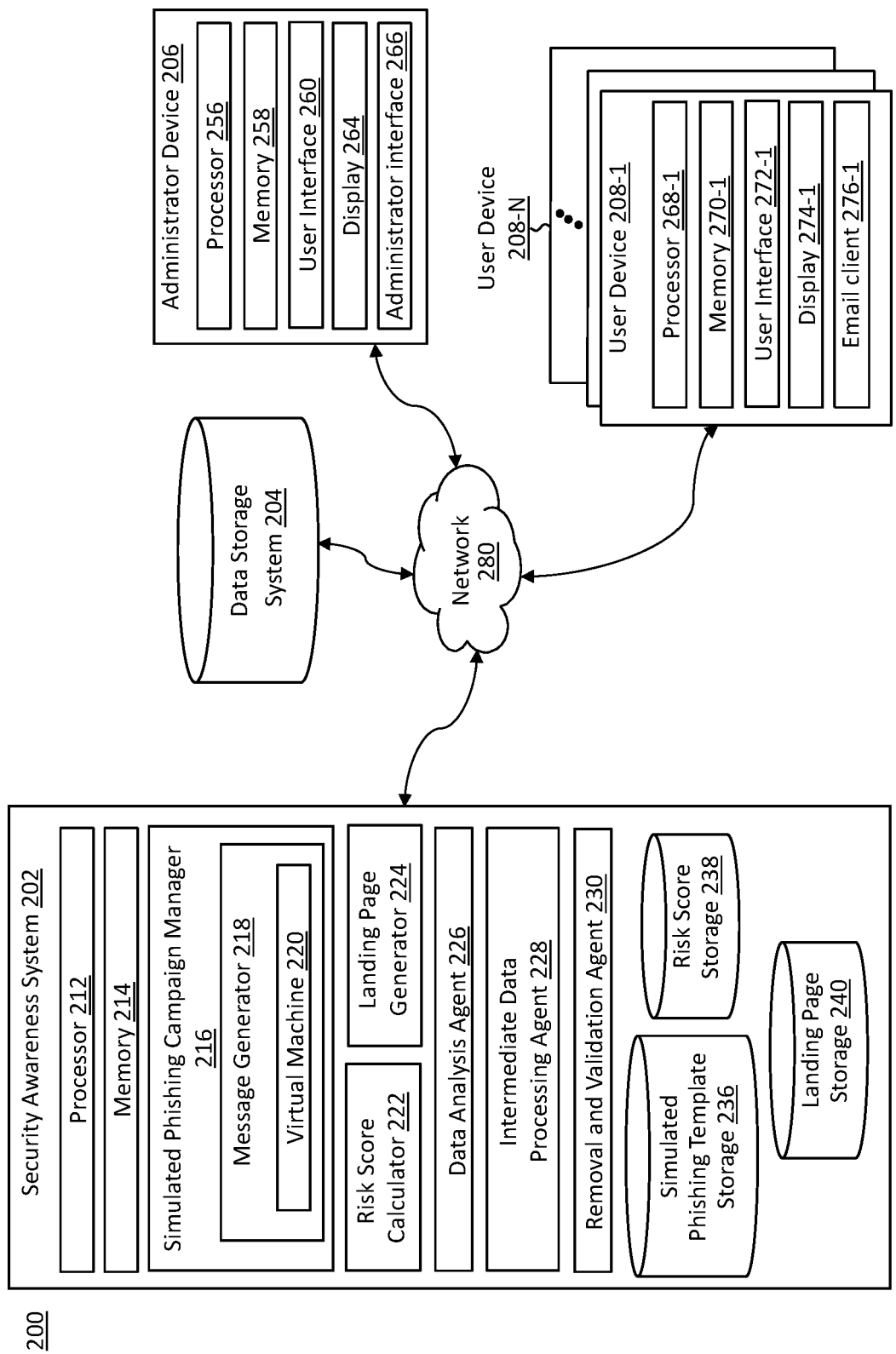
FIG. 2 depicts an implementation of some of a server and client architecture of a system for efficiently storing and removing personally identifiable information (PII) in a data storage system, according to one or more embodiments.

Referring to FIG. 2, in a general overview, FIG. 2 depicts some of the server and client architecture of an implementation of system 200 for efficiently storing and removing personally identifiable information (PII) in a data storage system, according to one or more embodiments. System 200 may be a part of software of security awareness system 120. System 200 may include security awareness system 202, data storage system 204, administrator device 206, user device(s) 208-(1-N), and network 280 enabling communication between the system components for information exchange. Network 280 may be an example or instance of network 104, details of which are provided with reference to FIG. 1A and its accompanying description.

According to some embodiments, security awareness system 202 may be implemented in a variety of computing systems, such as a mainframe computer, a server, a network server, a laptop computer, a desktop computer, a notebook, a workstation, and the like. In an implementation, security awareness system 202 may be implemented in a server, such as server 106 shown in FIG. 1A. In some implementations, security awareness system 202 may be implemented by a device, such as computing device 100 shown in FIG. 1C and FIG. 1D. In some embodiments, security awareness system 202, may be implemented as a part of a cluster of servers. In some embodiments, security awareness system 202 may be implemented across a plurality of servers, thereby, tasks performed by security awareness system 202 may be performed by the plurality of servers. These tasks may be allocated among the cluster of servers by an application, a service, a daemon, a routine, or other executable logic for task allocation.

In one or more embodiments, security awareness system 202 may be a system that manages items relating to cybersecurity awareness for an organization. The organization may be an entity that is subscribed to or that makes use of services provided by security awareness system 202. In examples, the organization may be expanded to include all users within the organization, vendors to the organization, or partners of the organization. According to an implementation, security awareness system 202 may be deployed by the organization to monitor and educate users thereby reducing cybersecurity threats to the organization. In an implementation, security awareness system 202 may educate users within the organization by performing simulated phishing campaigns on the users. In an example, a user of the organization may include an individual that is tested and trained by security awareness system 202. In examples, a user of the organization may include an individual that can or does receive electronic messages. For example, the user may be an employee of the organization, a partner of the organization, a member of a group, an individual who acts in any capacity with security awareness system 202 (such as a system administrator or a security administrator), or anyone associated with the organization. The system administrator may be an individual or team responsible for managing organizational cybersecurity aspects on behalf of an organization. The system administrator may oversee and manage security awareness system 202 to ensure cybersecurity awareness training goals of the organization are met. For example, the system administrator may oversee Information Technology (IT) systems of the organization for configuration of system personal information use, managing simulated phishing campaigns, identification, and classification of threats within reported emails, creation of user feedback questions, and any other element within security awareness system 202. Examples of system administrator include an IT department, a security administrator, a security team, a manager, or an Incident Response (IR) team. In some implementations, security awareness system 202 may be owned or managed or otherwise associated with an organization or any entity authorized thereof.

A simulated phishing attack is a technique of testing a user to see whether the user is likely to recognize a true malicious phishing attack and act appropriately upon receiving the malicious phishing attack. The simulated phishing attack may include links, attachments, macros, or any other simulated phishing threat (also referred to as an exploit) that resembles a real phishing threat. In response to user interaction with the simulated phishing attack, for example, if the user clicks on a link (i.e., a simulated phishing link), the user may be provided with security awareness training. In an example, security awareness system 202 may be a Computer Based Security Awareness Training (CB SAT) system that performs security services such as performing simulated phishing attacks on a user or a set of users of the organization as a part of security awareness training.

According to some embodiments, security awareness system 202 may include processor 212 and memory 214. For example, processor 212 and memory 214 of security awareness system 202 may be CPU 121 and main memory 122, respectively, as shown in FIG. 1C and FIG. 1D. Further, security awareness system 202 may include simulated phishing campaign manager 216. Simulated phishing campaign manager 216 may include various functionalities that may be associated with cybersecurity awareness training. In an implementation, simulated phishing campaign manager 216 may be an application or a program that manages various aspects of a simulated phishing attack, for example, tailoring and/or executing a simulated phishing attack. A simulated phishing attack may test the readiness of a user to manage phishing attacks such that malicious actions are prevented. For instance, simulated phishing campaign manager 216 may monitor and control timing of various aspects of a simulated phishing attack including processing requests for access to attack results, and performing other tasks related to the management of a simulated phishing attack.

In some embodiments, simulated phishing campaign manager 216 may include message generator 218 having virtual machine 220. Message generator 218 may be an application, service, daemon, routine, or other executable logic for generating messages. The messages generated by message generator 218 may be of any appropriate format. For example, the messages may be email messages, text messages, short message service (SMS) messages, instant messaging (IM) messages used by messaging applications such as, e.g., WhatsApp™, or any other type of message. In examples, a message type to be used in a particular simulated phishing communication may be determined by, for example, simulated phishing campaign manager 216. Message generator 218 generates messages in any appropriate manner, e.g., by running an instance of an application that generates the desired message type, such as running, e.g., a Gmail® application, Microsoft Outlook™, WhatsApp™, a text messaging application, or any other appropriate application. Message generator 218 may generate messages by running a messaging application on virtual machine 220 or in any other appropriate environment. Message generator 218 generates the messages to be in a format consistent with specific messaging platforms, for example, Outlook 365™, Outlook Web Access (OWA), Webmair, iOS®, Gmail®, and such formats.

In an implementation, message generator 218 may be configured to generate simulated phishing communications using a simulated phishing template. A simulated phishing template is a framework used to create simulated phishing communications. In some examples, a simulated phishing template may specify the layout and content of one or more simulated phishing communications. In an example, a simulated phishing template may include fixed content including text and images. In some examples, a simulated phishing template may be designed according to a theme or subject matter. The simulated phishing template may be configurable by a system administrator. For example, the system administrator may be able to add dynamic content to the simulated phishing template, such as a field that will populate with a recipient's name and email address when message generator 218 prepares simulated phishing communications based on the simulated phishing template for sending to a user. In an example, the system administrator may be able to select one or more exploits to include in the simulated phishing template, for example, one or more simulated malicious URLs, one or more simulated macros, and/or one or more simulated attachments. An exploit is an interactable phishing tool in in simulated phishing communications that can be clicked on or otherwise interacted with by a user. A simulated phishing template customized by the system administrator can be used for multiple different users in the organization over a period of time or for different campaigns. In some examples, a system administrator may select a simulated phishing template from a pool of available simulated phishing templates and may send such a "stock" template to users unchanged. The simulated phishing template may be designed to resemble a known real phishing attack such that simulated phishing communications based on the simulated phishing template may be used to train users to recognize these real attacks.

Referring again to FIG. 2, in some embodiments, security awareness system 202 may include risk score calculator 222. Risk score calculator 222 may be an application or a program for determining and maintaining risk scores for users in an organization. A risk score of a user may be a representation of vulnerability of the user to a malicious attack or the likelihood that a user may engage in an action associated with a security risk. In an implementation, risk score calculator 222 may maintain more than one risk score for each user. Each such risk score may represent one or more aspects of vulnerability of the user to a specific cyberattack. In an implementation, risk score calculator 222 may calculate risk scores for a group of users, for the organization, for an industry (for example, an industry to which the organization belongs), a geography, etc. In an example, a risk score of the user may be modified based on the user's responses to simulated phishing communications, completion of training by the user, a current position of the user in the organization, a size of a network of the user, an amount of time the user has held the current position in the organization, a new position of the user in the organization if the position changes, for example due to a promotion or change in department and/or any other attribute that can be associated with the user.

According to some embodiments, security awareness system 202 may include landing page generator 224. In an implementation, landing page generator 224 may be an application or a program for creation or modification of landing pages to facilitate security awareness training of users in the organization. In an example, a landing page may be a webpage or an element of a webpage that appears in response to a user interaction with a simulated phishing communication, such as clicking on a link, downloading an attachment or such actions, which in some examples enables provisioning of training materials.

According to some embodiments, security awareness system 202 may further include data analysis agent 226, intermediate data processing agent 228, and removal and validation agent 230. In an implementation, data analysis agent 226 may analyze a data record to determine PII data items, joined PII data items, and non-PII data items contained within and process the data items accordingly. In an implementation, intermediate data processing agent 228 may process a data record into an intermediate data record to the purposes of improving system performance. In an implementation, risk score calculator 222, landing page generator 224, data analysis agent 226, intermediate data processing agent 228, and removal and validation agent 230, amongst other units, may include routines, programs, objects, components, data structures, etc., which may perform particular tasks or implement particular abstract data types. In examples, risk score calculator 222, landing page generator 224, data analysis agent 226, intermediate data processing agent 228, and removal and validation agent 230 may also be implemented as signal processor(s), state machine(s), logic circuitries, and/or any other device or component that manipulate signals based on operational instructions.

In some embodiments, risk score calculator 222, landing page generator 224, data analysis agent 226, intermediate data processing agent 228, and removal and validation agent 230 may be implemented in hardware, instructions executed by a processing module, or by a combination thereof. In examples, the processing module may be central processing unit 121, as shown in FIG. 1D. The processing module may comprise a computer, a processor, a state machine, a logic array, or any other suitable devices capable of processing instructions. The processing module may be a general-purpose processor which executes instructions to cause the general-purpose processor to perform the required tasks or the processing module may be dedicated to performing the required functions. In some embodiments, risk score calculator 222, landing page generator 224, data analysis agent 226, intermediate data processing agent 228, and removal and validation agent 230 may be machine-readable instructions which, when executed by a processor/processing module, perform intended functionalities of risk score calculator 222, landing page generator 224, data analysis agent 226, intermediate data processing agent 228, and removal and validation agent 230. The machine-readable instructions may be stored on an electronic memory device, hard disk, optical disk, or other machine-readable storage medium or non-transitory medium. In an implementation, the machine-readable instructions may also be downloaded to the storage medium via a network connection.

In some embodiments, security awareness system 202 may include simulated phishing template storage 236, risk score storage 238, and landing page storage 240. In an implementation, simulated phishing template storage 236 may store simulated phishing templates. In examples, a simulated phishing template which may be customized by a system administrator may be stored in simulated phishing template storage 236 such that the simulated phishing template can be used for multiple different users in the organization over a period of time or for different campaigns. In some examples, the system administrator may select a simulated phishing template from a pool of available simulated phishing templates stored in simulated phishing template storage 236 and may send a "stock" template to users unchanged.

In some examples, simulated phishing template storage 236 may store failure rate data for one or more simulated phishing templates. In examples, the failure rate data may refer to data pertaining to failure rates associated with the template (e.g., a number of users that fail a simulated phishing test based on the template of all users that receive a simulated phishing test based on the template). Further, risk score storage 238 may store risk scores of users of an organization. In examples, a risk score of a user may be a representation of vulnerability of the user to a malicious attack. In one example, a user with a higher risk score may present a greater risk to the organization and a user with a lower risk score may present a lower risk to the organization.

In an implementation, landing page storage 240 may store landing page templates. Landing page templates may be templates to one or more web pages or websites that get presented to a user if the user interacts with a simulated phishing communication. In examples, landing page templates may be configured to include dynamic elements which will be adapted to the user the template is presented to. For example, a landing page template may have a field for a user's name and a user's email address, and when the landing page template is presented to the user, the user's actual name and email address are included on the landing page. A landing page may be used to provide security awareness training to a user that fails a simulated phishing test at the moment of the failure, or in examples a landing page may redirect a user that fails a simulated phishing test to another web address or location or server, where the user may be required to enroll in security awareness training that may be delivered at a different time and using a different mechanism, that is asynchronous with the failure itself.

Referring again to FIG. 2, data storage system 204 may store data records from security awareness system 202. The data records may include data corresponding to users of an organization in the form of data items. In examples, the data items may include users' security awareness testing, the users' response to security awareness testing, the users' training in response to security awareness testing, or other aspects of security awareness. In an example, a data record may include data items corresponding to a user and these data items may uniquely identify the user and tie that user to other data items, including sensitive, or otherwise private data. In an example, data that uniquely identifies the user may be referred to as personally identifiable information (PII), and other data which is not PII may be referred to as non-PII. In an implementation, the data records stored in data storage system 204 may be stored in any format which may be appropriate to hold the data. In an example, multiple formats of each data record may exist. The formats in which the data records are stored may be referred to as native data formats and they may be considered to be raw data formats.

In one or more embodiments, data storage system 204 may comprise a data lake.

In an implementation, data storage system 204 may maintain a PII data table which is configured to include PII. Further, data storage system 204 may maintain a joined PII data table which is configured to include joined PII. In examples, joined PII may include data which when combined become PII. In an example, a date of birth may not in its own right be PII but when combined with an organization, it may become PII. In this example, both the date of birth and the organization may be labeled as joined PII because circumstance may make them become PII. In some implementations, PII data table and joined PII data table may be combined to create a single table containing all non-PII. Although, it has been shown that data storage system 204 is implemented external to security awareness system 202, in some embodiments, data storage system 204 may be implemented within security awareness system 202.

In some embodiments, administrator device 206 may be any device used by a user or a system administrator or a security administrator to perform administrative duties. Administrator device 206 may be any computing device, such as a desktop computer, a laptop, a tablet computer, a mobile device, a Personal Digital Assistant (PDA), smart glasses, or any other computing device. In an implementation, administrator device 206 may be a device, such as client device 102 shown in FIG. 1A and FIG. 1B. Administrator device 206 may be implemented by a device, such as computing device 100 shown in FIG. 1C and FIG. 1D. According to some embodiments, administrator device 206 may include processor 256 and memory 258. In an example, processor 256 and memory 258 of administrator device 206 may be CPU 121 and main memory 122, respectively, as shown in FIG. 1C and FIG. 1D. Administrator device 206 may also include user interface 260, such as a keyboard, a mouse, a touch screen, a haptic sensor, a voice-based input unit, or any other appropriate user interface. It shall be appreciated that such components of administrator device 206 may correspond to similar components of computing device 100 in FIG. 1C and FIG. 1D, such as keyboard 126, pointing device 127, I/O devices 130a-n and display devices 124a-n. Administrator device 206 may also include display 264, such as a screen, a monitor connected to the device in any manner, wearable glasses, or any other appropriate display. In some implementations, administrator device 206 may include an administrator interface 266. Administrator interface 266 may be supported by a library, an application programming interface (API), a set of scripts, or any other code that may enable the system administrator to manage security awareness system 202.

Referring again to FIG. 2, in one or more embodiments, user device 208-(1-N) may be any device used by a user (all devices of user device 208-(1-N) are subsequently referred to as user device 208-1 however, the description may be generalized to any of user device 208-(1-N)). The user may be an employee of an organization, a client, a vendor, a customer, a contractor, a system administrator, or any person associated with the organization. User device 208-1 may be any computing device, such as a desktop computer, a laptop, a tablet computer, a mobile device, a Personal Digital Assistant (PDA), or any other computing device. In an implementation, user device 208-1 may be a device, such as client device 102 shown in FIG. 1A and FIG. 1B. User device 208-1 may be implemented by a device, such as computing device 100 shown in FIG. 1C and FIG. 1D. According to some embodiments, user device 208-1 may include processor 268-1 and memory 270-1. In an example, processor 268-1 and memory 270-1 of user device 208-1 may be CPU 121 and main memory 122, respectively, as shown in FIG. 1C and FIG. 1D. User device 208-1 may also include user interface 272-1, such as a keyboard, a mouse, a touch screen, a haptic sensor, a voice-based input unit, or any other appropriate user interface. It shall be appreciated that such components of user device 208-1 may correspond to similar components of computing device 100 in FIG. 1C and FIG. 1D, such as keyboard 126, pointing device 127, I/O devices 130a-n and display devices 124a-n. User device 208-1 may also include display 274-1, such as a screen, a monitor connected to the device in any manner, or any other appropriate display, which may correspond to similar components of computing device 100, for example, display devices 124a-n. In an implementation, user device 208-1 may display received content (for example, a simulated phishing communication based on a simulated phishing template) for the user using display 274-1 and is able to accept user interaction via user interface 272-1 responsive to the displayed content.

Referring again to FIG. 2, in some embodiments, user device 208-1 may include email client 276-1. In one example, email client 276-1 may be a cloud-based application that can be accessed over network 280 without being installed on user device 208-1. In an implementation, email client 276-1 may be any application capable of composing, sending, receiving, and reading email messages. In an example, email client 276-1 may facilitate a user to create, receive, organize, and otherwise manage email messages. In an implementation, email client 276-1 may be an application that runs on user device 208-1. In some implementations, email client 276-1 may be an application that runs on a remote server or on a cloud implementation and is accessed by a web browser. For example, email client 276-1 may be an instance of an application that allows viewing of a desired message type, such as any web browser, Microsoft Outlook™ application (Microsoft, Mountain View, California), IBM® Lotus Notes® application, Apple® Mail application, Gmail® application (Google, Mountain View, California), WhatsApp™ (Facebook, Menlo Park, California), a text messaging application, or any other known or custom email application. In an example, a user of user device 208-1 may be mandated to download and install email client 276-1 on user device 208-1 by the organization. In an example, email client 276-1 may be provided by the organization as default. In some examples, a user of user device 208-1 may select, purchase and/or download email client 276-1 through an application distribution platform. In some examples, user device 208-1 may receive simulated phishing communications via email client 276-1. Other user devices 208-(2-N) may be similar to user device 208-1.

According to an implementation, data analysis agent 226 may be configured to receive a request (for example, a first request) to store data to one or more data records in data storage system 204. In examples, the data may include one or more data items of PII of a user, joined PII, and non-PII. In an example, data analysis agent 226 may receive the request from a system administrator. In some examples, data analysis agent 226 may receive the request from the user. In an example, the user may be an existing user (i.e., current employee). In some examples, the user may be a new user (i.e., a new employee). In examples, the one or more PII data items may be data items that may uniquely identify the user. The one or more joined PII data items may be data items which in combination with other data items become PII. Further, the one or more non-PII data items may be data items that are not PII data items. In an example, PII may include sensitive and/or private data. Examples of PII of the user may include name, username, employee ID, social security number (or other national ID), email address, personal email address, cell phone number, work telephone number, Slack ID, and social media handle. An example of joined PII may be job title and office location. In an example, in a smaller organization, a job title "Finance Controller" may uniquely identify a single user (or person). In another example, a job title "Finance Controller" linked with an office location "Germany" may uniquely identify a single user (or person).

According to an implementation, in response to receiving the request to store data to one or more data records in data storage system 204, data analysis agent 226 may store the data including one or more PII data items, the one or more joined PII data items and the one or more non-PII data items to a data record of the one or more data records. In examples, data analysis agent 226 may store the data in a native data format. In some implementations, data analysis agent 226 may store the data in more than one data record.

In an implementation, data analysis agent 226 may generate a PII user identifier for the user. In examples, if the user is a new user, then data analysis agent 226 may generate a new PII user identifier. In some examples, if the user is an existing user, then a PII user identifier need not be generated, and an existing PII user identifier may be used. In examples, the PII user identifier may the same as a global user identifier. The global user identifier may be a unique value that identifies the user in data storage system 204.

According to an implementation, data analysis agent 226 may identify that the data record has the one or more PII, one or more joined PII, and one or more non-PII data items within the data. In an implementation, data analysis agent 226 may process the data stored in the data record to identify the one or more PII, one or more joined PII, and one or more non-PII data items. In an implementation, data analysis agent 226 may be configured to parse the data in its native format. According to an implementation, data analysis agent 226 may implement a native format filter or a native format application programming interface (API) to extract the data items for processing. In an implementation, when data analysis agent 226 extracts the data items for processing, data analysis agent 226 may identify whether the data items are PII data items or joined PII data items.

According to an implementation, data analysis agent 226 may run an automated algorithm to process the data items in the data record. In an implementation, data analysis agent 226 may run the automated algorithm when security awareness system 202 is configured. In some implementations, data analysis agent 226 may run the automated algorithm on a periodic basis. In some implementations, data analysis agent 226 may run the automated algorithm each time a data record is added to data storage system 204. In an implementation, data analysis agent 226 may identify combinations of data items which may uniquely identify the user. In an implementation, the one or more joined PII data items may be identified as a part of configuration of security awareness system 202, for example, by a system administrator. In examples, data analysis agent 226 may flag the data items that join together and label these data items as joined PII data items. As a result, PII data items are distinguished from the joined PII data items.

Upon identifying that the data record has one or more PII, one or more joined PII, and one or more non-PII data items within the data, data analysis agent 226 may store the one or more PII data items in a PII data table in association with the PII user identifier. Further, data analysis agent 226 may store the one or more joined PII data items in a joined PII data table in association with the PII user identifier. In examples, the PII data table and the joined PII data table may be included in a single table associated with the PII user identifier. In an implementation, the PII data table and the joined PII data table may be created in advance of any processing (and may be maintained in data storage system 204). In some implementations, the PII data table and the joined PII data table may be created as required by security awareness system 202.

In an example, a change to data stored in the data record my mean that data items identified as non-PII may become PII or joined PII. In an implementation, this change of type for the data item may be detected and data analysis agent 226 may reprocess the data record to identify the new determined PII or joined PII and to process. In examples, the processing of PII and joined PII already described will be applied to the newly-determined PII or joined PII. In some examples the automated algorithm to process the data items in the data record may detect that non-PII has become PII or joined PII and data analysis agent 226 may process the PII or joined PII.

According to an implementation, data analysis agent 226 may replace, in the data record, the one or more PII data items with a first set of links to the one or more PII data items stored in the PII data table in association with the PII user identifier and the one or more joined PII data items with a second set of links to the one or more joined PII data items stored in the joined PII data table in association with the PII user identifier. In an example, an email address of the user may be placed in the PII data table that is associated with PII user identifier "1001". In examples, the email address may be replaced with a link to the PII data table including the email address and associated with PII user identifier "1001". In an implementation, once the data items have been processed, data analysis agent 226 may store the new data in data storage system 204 as a data record.

Figure 3:
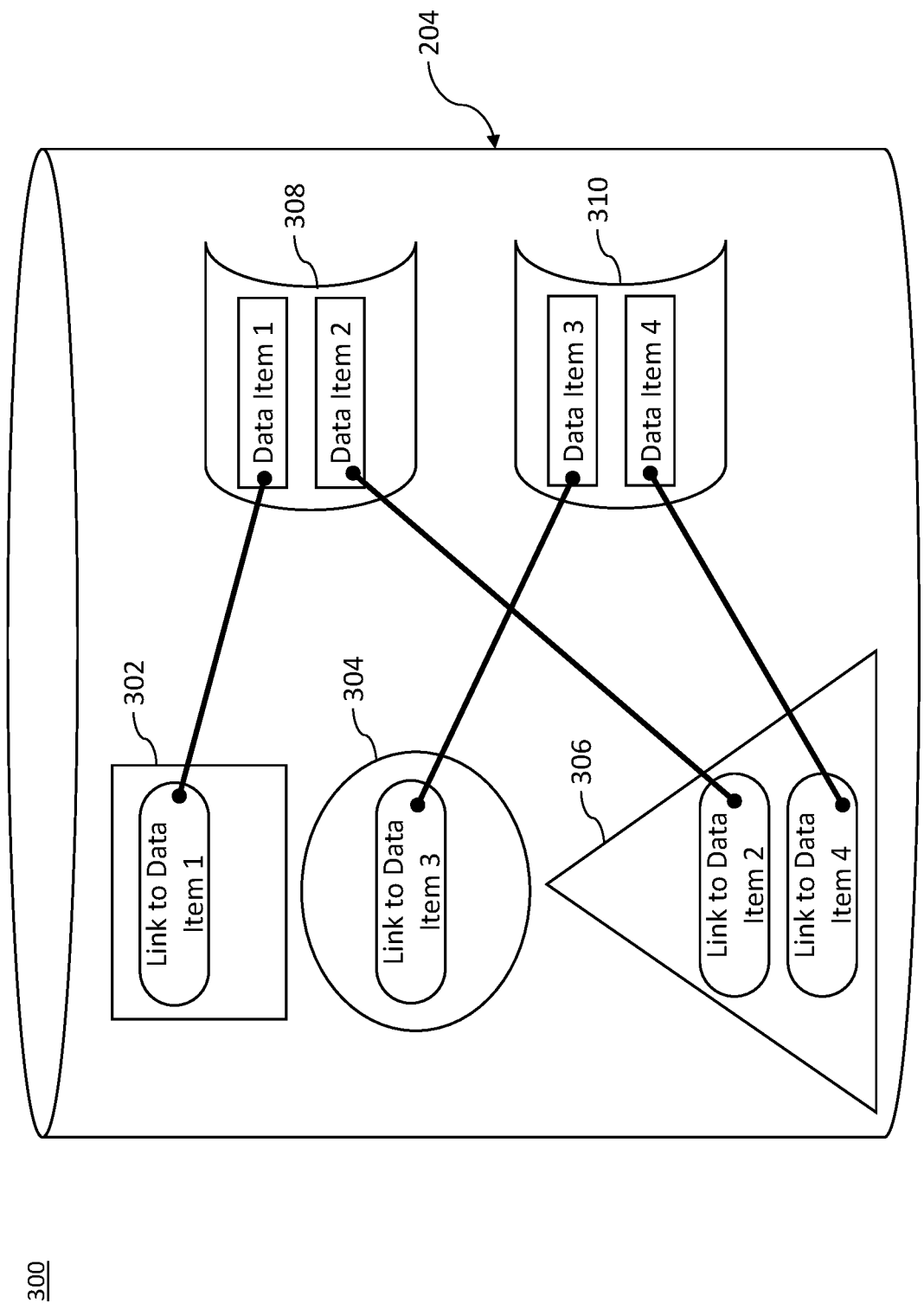
FIG. 3 depicts an example of a data storage system, according to one or more embodiments.

FIG. 3 depicts example 300 of data storage system 204, according to one or more embodiments.

In the example of FIG. 3, data storage system 204 includes three data records including data record A (represented by reference number "302"), data record B (represented by reference number "304"), and data record C (represented by reference number "306"). In examples, data record A, data storage B, and data storage C may be of different formats (illustrated by different shapes in FIG. 3). Further, as described in FIG. 3, data storage system 204 includes two data tables including PII data table (represented by reference number "308") and joined PII data table (represented by reference number "310"). In examples, PII data table 308 includes data items pertaining to PII, and joined PII data table 310 includes data items pertaining to joined PII. In the example of FIG. 3, PII data table 308 includes data item 1 and data item 2. Further, joined PII data table 310 includes data item 3 and data item 4. Also, data record A, data record B, and data record C include links to the PII or joined PII data items. In examples, data record A includes link to data item 1, data record B includes link to data item 3, and data record C includes link to data item 2 and link to data item 4.

According to an implementation, data records which are added to data storage system 204 may undergo processing to generate related intermediate data records in one or more intermediate formats. An intermediate data record may allow quicker or more efficient processing of data stored in data storage system 204. In examples, the intermediate data record may be stored in data storage system 204 alongside or, in some examples, replacing the data record. Examples of processing include, but are not limited to, a data cleansing action where the data record is checked for consistency, for bounds of data, for missing data, etc., or a consolidation action where data is consolidated to support later processing, reporting, or visualization.

In an implementation, to increase the speed of generation of reports in security awareness system 202 and/or to improve performance of data storage system 204, intermediate data processing agent 228 may process the data record in data storage system 204 to form an intermediate data record. In an implementation, intermediate data processing agent 228 may create an intermediate data record to store one of a copy of the one or more PII data items or the first set of links to the one or more PII data items and one of a copy of the one or more joined PII data items or the second set of links to the one or more joined PII data items. In examples, each of the one or more PII data items or each of the one or more joined PII data items may be copied into the intermediate data record as a value (i.e., each of the one or more PII data items or each of the one or more joined PII data items are not stored as a reference to the PII or joined PII). In an implementation, the intermediate data record may be tagged by intermediate data processing agent 228 as including each of the one or more PII data items or each of the one or more joined PII data items as a value. Where the intermediate data record includes each of the one or more PII data items or each of the one or more joined PII data items as a value, the intermediate data record may be associated with the data record that included the one or more PII data items and the one or more joined PII data items, and the association may be indicated by a data field or a flag. In an implementation, intermediate data processing agent 228 may refer to the association to determine that the PII or joined PII has been updated in the data record and that the copy of the PII or the copy of the joined PII should also be updated.

Figure 4:
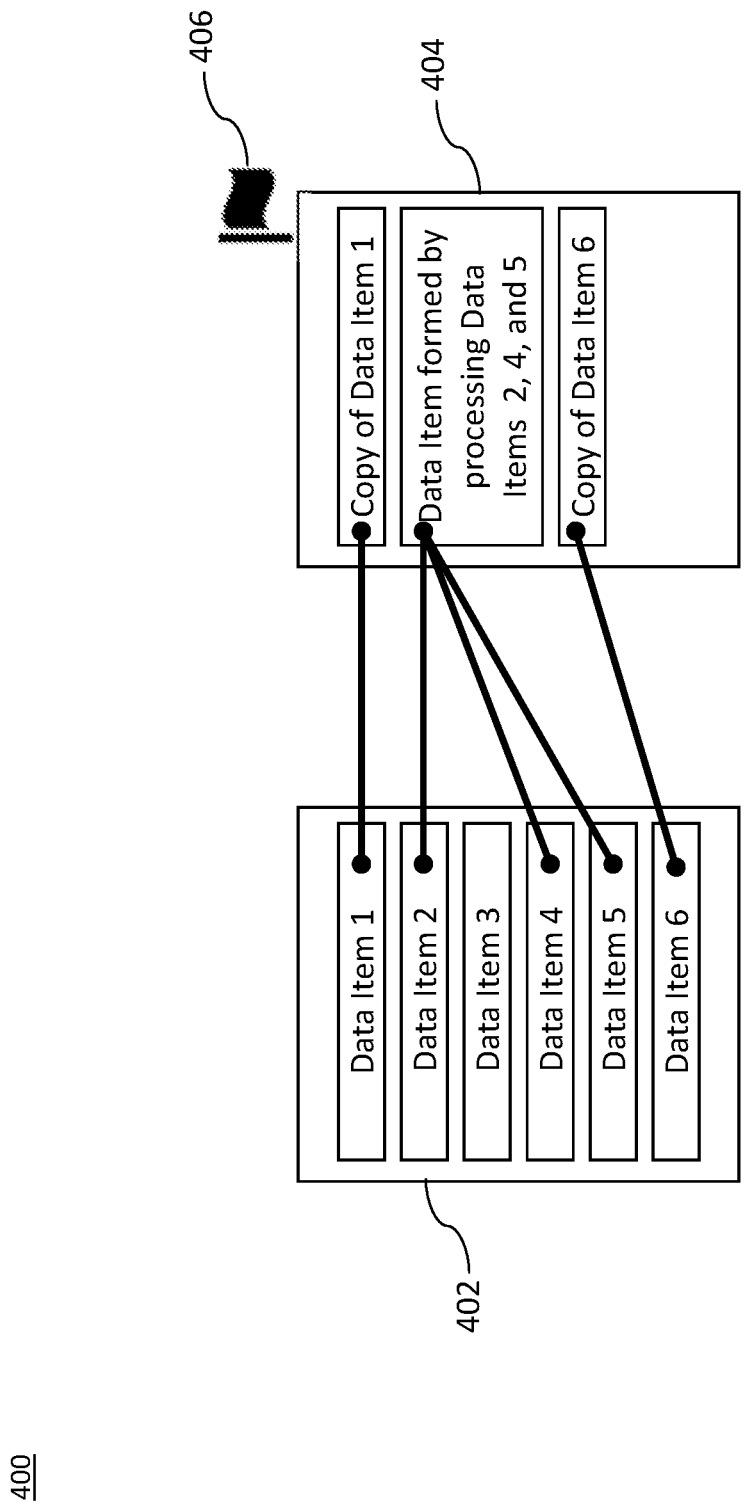
FIG. 4 depicts an example of a data record which has been processed into an intermediate data record, according to one or more embodiments.

FIG. 4 depicts example 400 of a data record which has been processed into an intermediate data record, according to one or more embodiments.

In example 400, a data record (represented by reference number "402") and an intermediate data record (represented by reference number "404") are shown In examples, data record 402 may be an example of data record A, data record B, or data record C as described in FIG. 3. In the example of FIG. 4, data records 402 stores data item 1, data item 2, data item 3, data item 4, data item 5, and data item 6.

In an example, data item 6 may be determined to be a PII data item or a joined PII data item. Intermediate data record 404 may store a copy of data item 1, which may contain non-PII, and a copy of data item 6, which may be a PII data item. In addition data item 2, data item 4, and data item 5 are shown by way of example to have been processed into a new data item as part of the generation of intermediate data record 404. In an example, flag 406 is set to indicate that intermediate data record 404 contains a copy of a PII data item (data item 6).

Figure 5:
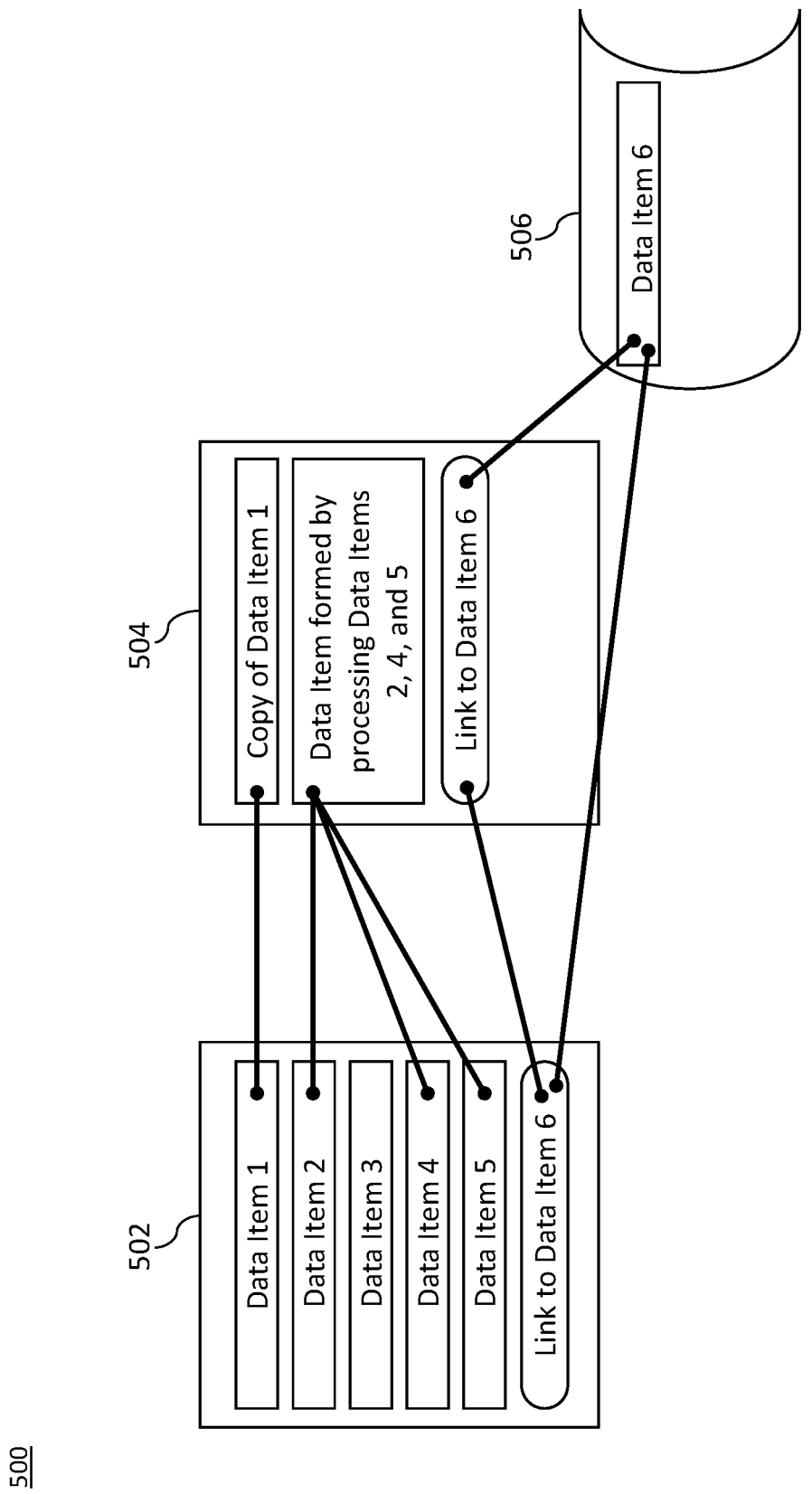
FIG. 5 depicts an example of a PII data item that has been stored in a PII data table and accessed in a data record and an intermediate data record by reference, according to one or more embodiments.

FIG. 5 depicts example 500 of a PII data item that has been stored in a PII data table and accessed in a data record and an intermediate data record by reference, according to one or more embodiments.

In particular, FIG. 5, shows an example of a data record (represented by reference number 502) which is subsequently processed to an intermediate data record (represented by reference number 504) in which one data item is determined to be a PII data item and is replaced in both the data record and the intermediate data record as a link to the PII data item included in a PII data table (represented by reference number 506) In examples, data record 502 may be an example of data record A, data record B, or data record C as described in FIG. 3. As described for example 400, data item 1 may contain non-PII, data item 6 may be a PII data item, and data item 2, data item 4, and data item 5 may be processed into a new data item as part of the generation of intermediate data record 504.

In the example of FIG. 5, data item 6 is determined to be a PII data item and is replaced in both data record 502 and intermediate data record 504 as a link to the data item which is a PII data item stored in PII data table 506. As described in FIG. 5, the data record and the intermediate data record include links to data item 6 included in PII data table 506.

In an implementation, after a data record and/or an intermediate data record have been written to data storage system 204, the data record and/or the intermediate data record may be accessed for further processing, reporting, and/or visualization. In an example, the data record may be accessed using a querying language, such as Apache Spark or ANSI SQL. In examples, a report generated by security awareness system 202 may be required to combine data from many data records. For example, an average risk score for all users in an organization, or a range of phish prone percentage across all users in a department of an organization may be calculated. In an example, a phish prone percentage of a user may be a metric representing a proportion of simulated phishing attacks or real phishing attacks that the user has failed out of a total of simulated phishing attacks or real phishing attacks the user has received. In examples, to generate the report, a query accessing the data records stored by data storage system 204 may be constructed. In examples, where the data record and/or the intermediate data record includes a value (whether it is PII, joined PII, or non-PII), then the query may access the value and process the value. In examples, where the data record and/or the intermediate data record includes a reference to a value (whether it is PII or joined PII), then the query may process (or follow) the reference to access the value from the respective data table and to process the value which is referenced.

According to an implementation, there may be a requirement to remove PII from the data record. This may be as a response to a request from a user identified in data storage system 204 and may be as part of the EU's General Data Protection Regulation (GDPR). In examples, security awareness system 202 or data storage system 204 may maintain history of data added to, changed within, and removed from data storage system 204.

In an implementation, removal and validation agent 230 may be configured to receive a request (for example, second request) to remove PII and/or joined PII associated with the user. In an implementation, removal and validation agent 230 may replace at least the one or more PII data items in PII data table 308 with a value indicating the PII data item has been removed. In an example, the value may include a string that identifies details of the removal of the PII. In some implementations, removal and validation agent 230 may replace the one or more joined PII data items in joined PII data table 310 with the value indicating that the one or more joined PII data item has been removed. In an example, the value may include a string that identifies details of the removal of the joined PII. In some implementations, removal and validation agent 230 may remove, responsive to the second request, the copy of the one or more PII data items and the copy of the one or more joined PII data items from the intermediate data record. Examples by which PII data items, joined PII data items, copy of the PII data items, and copy of the joined PII data items are removed are described in detail below.

According to an implementation, on receiving the second request, removal and validation agent 230 may obtain a PII user identifier of the user. In examples, the PII user identifier may be identified via a global user identifier which may be obtained by removal and validation agent 230. Depending on the method that identifies PII in data storage system 204, the global user identifier or the PII user identifier may identify a record in PII data table 308. In an implementation, removal and validation agent 230 may verify if the second request includes an instruction to remove the PII of the user. In some examples, removal and validation agent 230 may validate that the second request is authentic. If removal and validation agent 230 verifies (and possibly validates) that the second request includes the instruction to remove the PII of the user, then the PII of the user in PII data table 308 may be replaced by a value that represents a removed field. In an example, the value may be zero ("0") or a blank string. In some examples, the value may be NULL or not a number (NaN). In some examples, the value may be a string indicating that the record has been removed. In the example, the string may be "this record has been removed". In some examples, the value may be a string indicating details of its removal. In the example, the string may be "this record has been removed in accordance with a request under GDPR actioned at 09:00UTC-05:00 2022-09-15". In some examples, the value may be a string indicating the data item that has been removed. In the example, the string may be "This record of user email address has been removed".

In an implementation, when PII is removed, removal and validation agent 230 may timestamp the removal. However, a query of a data record which includes a timestamp and which would return PII may not show any value for PII, or may show an indication that the PII has been removed irrespective of whether the time in the query is before the timestamp of removal of PII or after the timestamp of removal of PII. Further, if a change to PII data table 308 is made, removal and validation agent 230 may determine intermediate data records that were created with a copy of PII data. In examples, removal and validation agent 230 may determine an intermediate data record by referencing a data field or a flag that indicates that the intermediate data record includes a copy of PII, and in some cases may identify the PII (for example, the PII data item). In an implementation, removal and validation agent 230 may identify the copy of PII in the intermediate data record and may remove the copy of PII. In examples, the copy of PII may be replaced by the same values which indicate that a record has been removed as those that replaced the original PII. In some examples, the intermediate data record may retain a historical record. In an implementation, removal and validation agent 230 may reprocess all historical versions of the intermediate data records and carry out the removal of the copy of PII so that no record of the PII remains in any stored version of the intermediate data records.

In an implementation, removal and validation agent 230 may verify if the second request includes an instruction to remove the joined PII. In examples, removal and validation agent 230 may remove all data items which are identified as joined PII. In an example, all data items which are identified as joined PII are stored in joined PII data table 310. In examples, where joined PII is identified and subsequently removed, then the value of the joined PII may be replaced by a value that reflects that the data item has been removed. As in the case of PII, when a change to the joined PII is detected, removal and validation agent 230 may reprocess all intermediate data records and all historical intermediate data records to remove copies of the joined PII. When PII or joined PII has been removed, removal and validation agent 230 may provide a status code or a return value which records the success or failure or other information on the operation of removal and validation agent 230. A value that represents a successful operation may indicate that all PII and joined PII have been removed from data storage system 204 and that the removal has been verified by removal and validation agent 230. Other values may indicate that PII or joined PII cannot be identified in the data record, or that PII or joined PII has been removed but has not been or cannot be verified to be removed.

In examples, if PII is removed then it is removed in the partitioned PII and the links that previously referenced the PII remain valid but now reference a note that PII has been removed. In this manner, historically queries may not refer PII that has been removed and the removal propagates through all time. If a joined data item has been removed, then removal and validation agent 230 may determine whether the remaining data has become PII. In examples, if this is the case, then all joined PII data items are removed.

Further, in examples, where PII or joined PII that has become PII has been copied by value into the intermediate data record, the removed PII may be identified by reference to the flag indicating that PII has been copied by value and by the data field that identifies the PII. In an implementation, removal and validation agent 230 may reprocess the intermediate data record to remove the PII or joined PII. In examples, where a historical record of the intermediate data record exists, then removal and validation agent 230 may reprocess all instances of the intermediate data record over all time to remove all instances of the PII. In such cases, the PII is replaced by a null field, thereby maintaining the integrity of the data record.

According to an implementation, removal and validation agent 230 may validate that removal of the PII associated with the user has occurred correctly and throughout data storage system 204. In an implementation, removal and validation agent 230 may receive a request to validate all removals of PII which have been processed over a time period. In an example, removal and validation agent 230 may receive a request to validate all requests to remove PII which have been processed over the preceding 24 hours or the preceding week. In an implementation, removal and validation agent 230 may execute a query or run a report to extract all data records which are associated with the user for whom PII has been removed. According to an implementation, removal and validation agent 230 may then validate from the result of the query or the report that no PII is present which links the data in the result of the query or the report to the user that requested the PII to be removed. Further, removal and validation agent 230 may determine from the result of the query or the report that joined PII has been removed from one or more data records as a result of the requests to remove joined PII In some examples, removal and validation agent 230 may determine from a placeholder value in a data field (e.g., "this record has been removed"). Removal and validation agent 230 may refer to a data record containing rules which determine joined PII to validate that all joined PII has been removed.

According to an implementation, data in data storage system 204 may be accessed using a query. In examples, the data may be accessed using a querying language, for example, Apache Spark or ANSI SQL. In an implementation, the query may provide instruction on data that is to be accessed and how that data may be processed. In examples, for the benefit of speed of operation of the query, the query may access intermediate data records which have been preprocessed.

In examples, a report that includes information related to all simulated phishing campaigns that users of an organization have been part of and the users response to the simulated phishing communications derived from simulated phishing templates within the simulated phishing campaigns may be derived from intermediate data records which have been preprocessed to combine aspects of the simulated phishing campaign data. In some examples, the report may include information of all training activities from security awareness system 202. The training activities may be linked to simulated phishing campaigns and simulated phishing communications which prompted the training activities, and may be linked to a user of an organization via PII. Even with data records which have had their PII removed, the simulated phishing campaigns which have resulted in training activities may include critical data to the organization and that data may be preserved and made available to the system administrator.

In examples, the intermediate data records may include PII or joined PII which has been removed. Further, in examples, where the query accesses data from the data record which is now associated with removed PII or removed joined PII, but is not the removed PII or removed joined PII, then the query progresses in a normal manner. For example, a query that requires risk scores from users in an organization should not depend on the identity of an individual user (e.g., all US-based users, all EU-based users, all APAC-based users, etc.) and so the values of risk score returned by the query may not be affected by whether a user has had his/her identity removed and replaced by "this record has been removed".

In some examples, the query may access data items which refer to PII or joined PII by a reference and key. In these examples, the reference may be followed to access the referenced PII or joined PII, and the PII or joined PII replaces the reference in the result (or the interim processing step) of the query. In some examples, an access time is provided as a part of the query. This access time may be in the past and may therefore, refer to an historical version of a data item. In these examples, the same logic as described for a query in the present time is followed and the historical removal of PII and joined PII does not affect queries which do not depend on the removed data items.

In an implementation, removal and validation agent 230 may provide, responsive to validating, a report that the PII associated with the user and the joined PII have been removed from the data records in data storage system 204. In examples, to generate the report, a time scale or a user identifier (for example, the global user identifier or the PII user identifier) may be provided to removal and validation agent 230. Alternatively, other pieces of information that may identify a user may be provided to removal and validation agent 230, and removal and validation agent 230 may identify the user identifier from the pieces of information. In some examples, removal and validation agent 230 may identify possible matches to the user identifier from the pieces of information and may provide a means for a system administrator to select the correct user identifier. In other examples, a report may be provided on all matches (of user identifiers) to the pieces of information.

In an implementation, removal and validation agent 230 may provide a report on the description of all PII and joined PII data items which have been removed in the provided time scale. In examples, removal and validation agent 230 may provide a report that PII and joined PII for a specified user is stored or that it has been removed or that it has never been gathered. In some examples, removal and validation agent 230 may provide a report on data items which have been determined to be joined PII and the reason as to why the determination has been made. In an implementation, removal and validation agent 230 may access data records in data storage system 204 via an API or it may form a query to data storage system 204. In examples, removal and validation agent 230 may provide its report in a document format such as Microsoft Word, Adobe PDF, or plain text. In some examples, removal and validation agent 230 may provide its report in a Web format such as HTML for presentation in a browser.

Figure 6A:
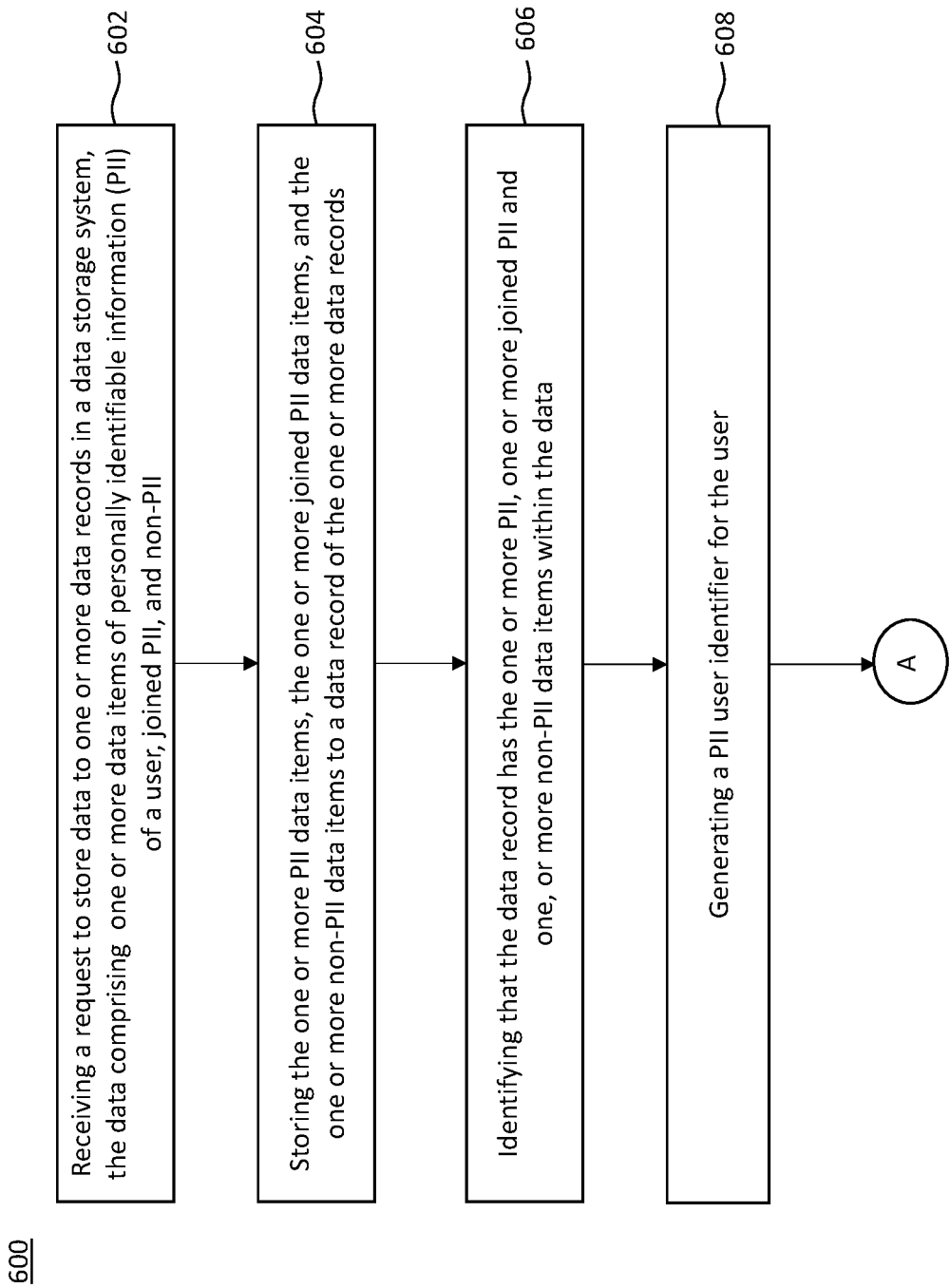
FIG. 6A, FIG. 6B, and FIG. 6C depict a flowchart for efficiently storing and removing PII in a data storage system, according to one or more embodiments.
Figure 6B:
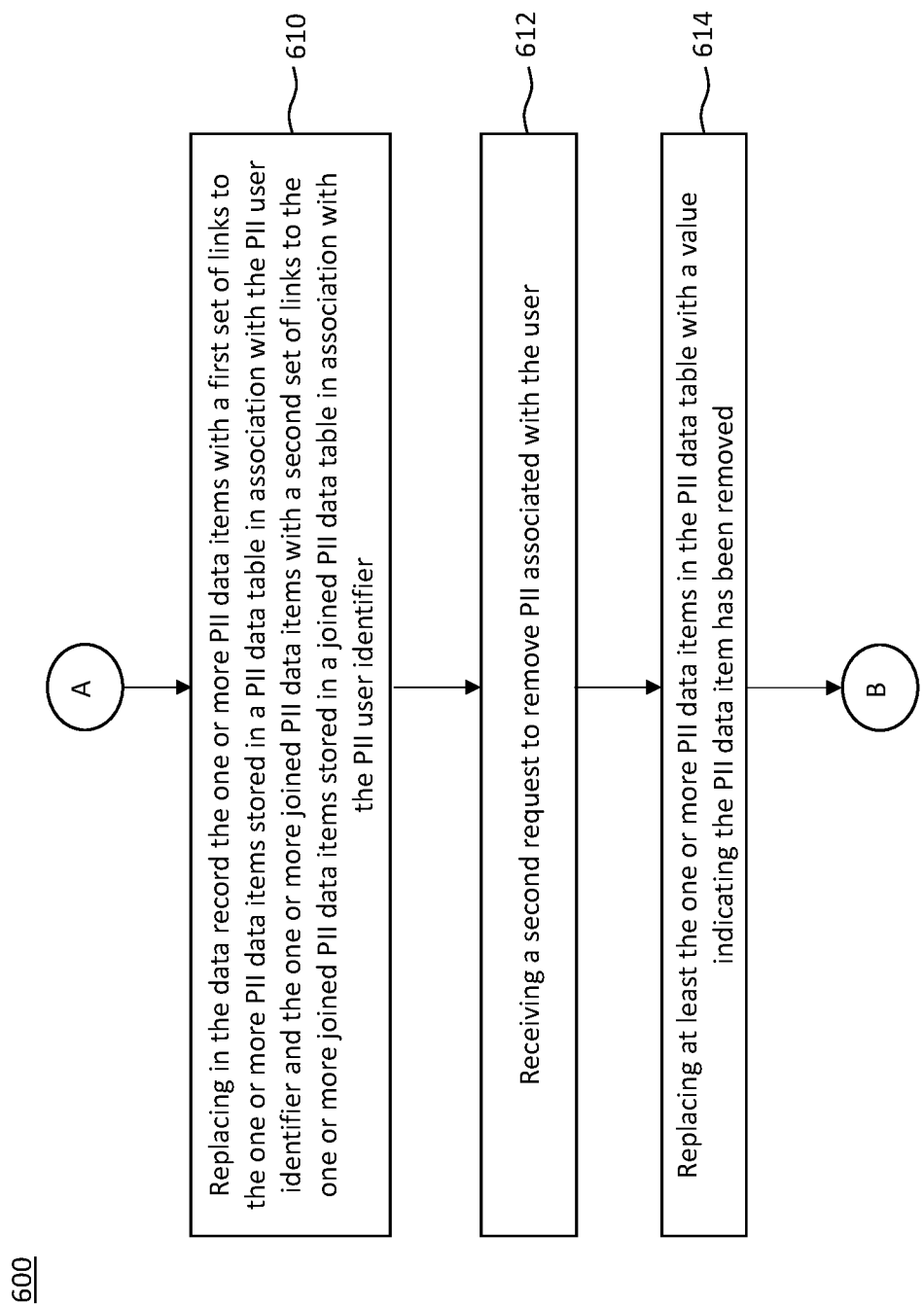
Figure 6C:
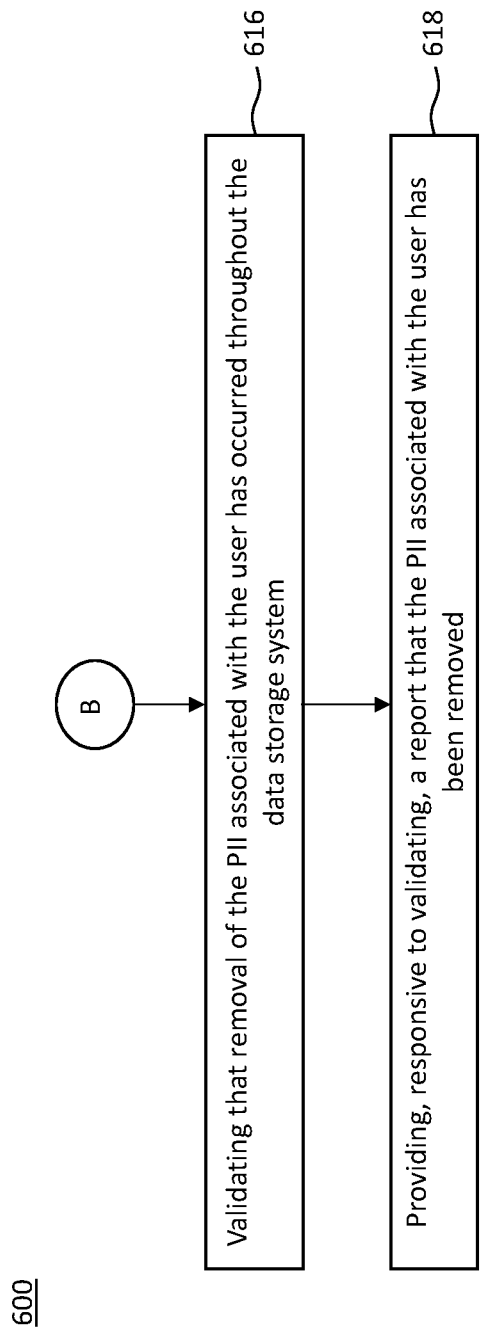
Figure 7A:
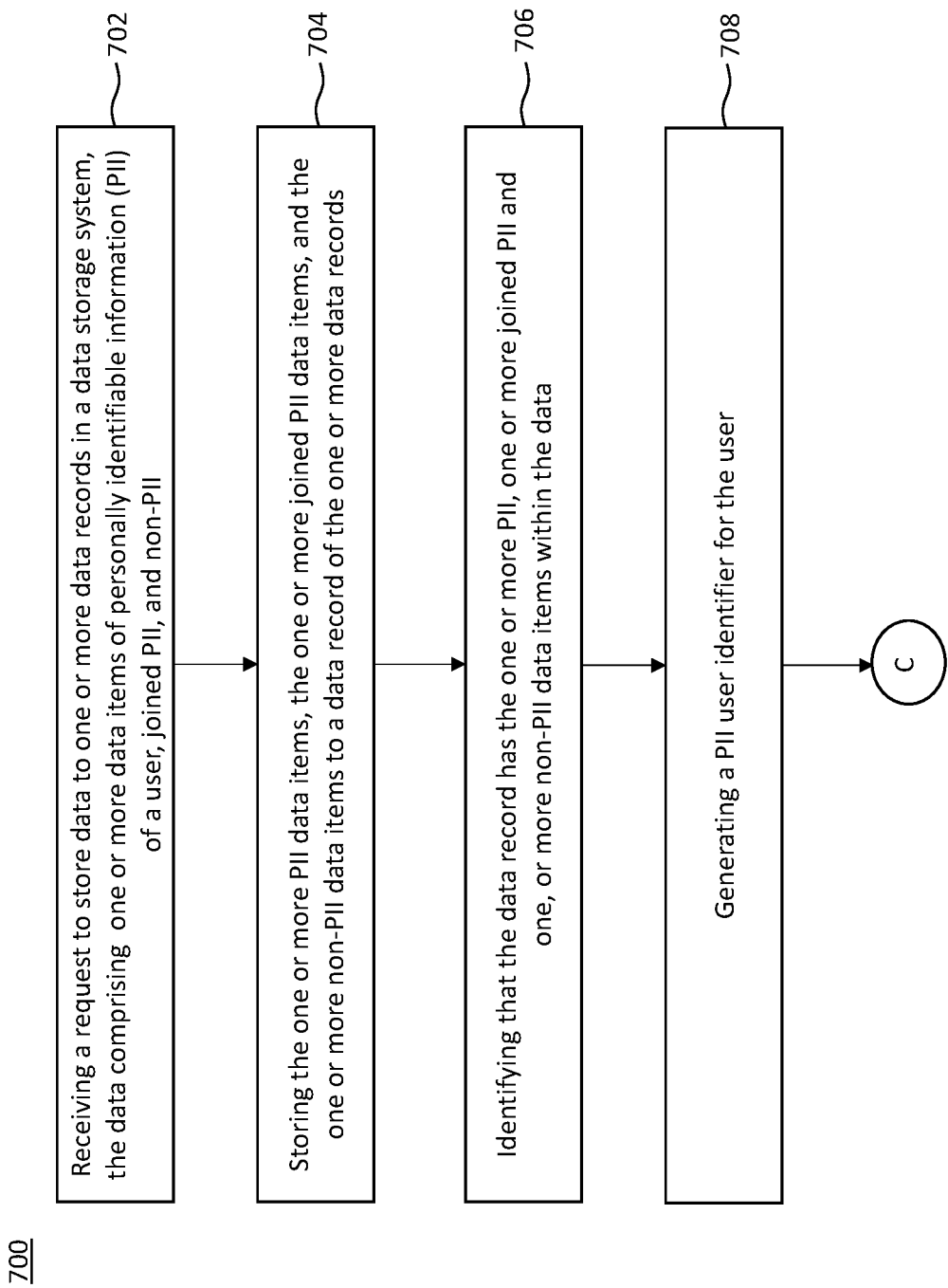
FIG. 7A, FIG. 7B, FIG. 7C, and FIG. 7D depict another flowchart for efficiently storing and removing PII in a data storage system, according to one or more embodiments.
Figure 7B:
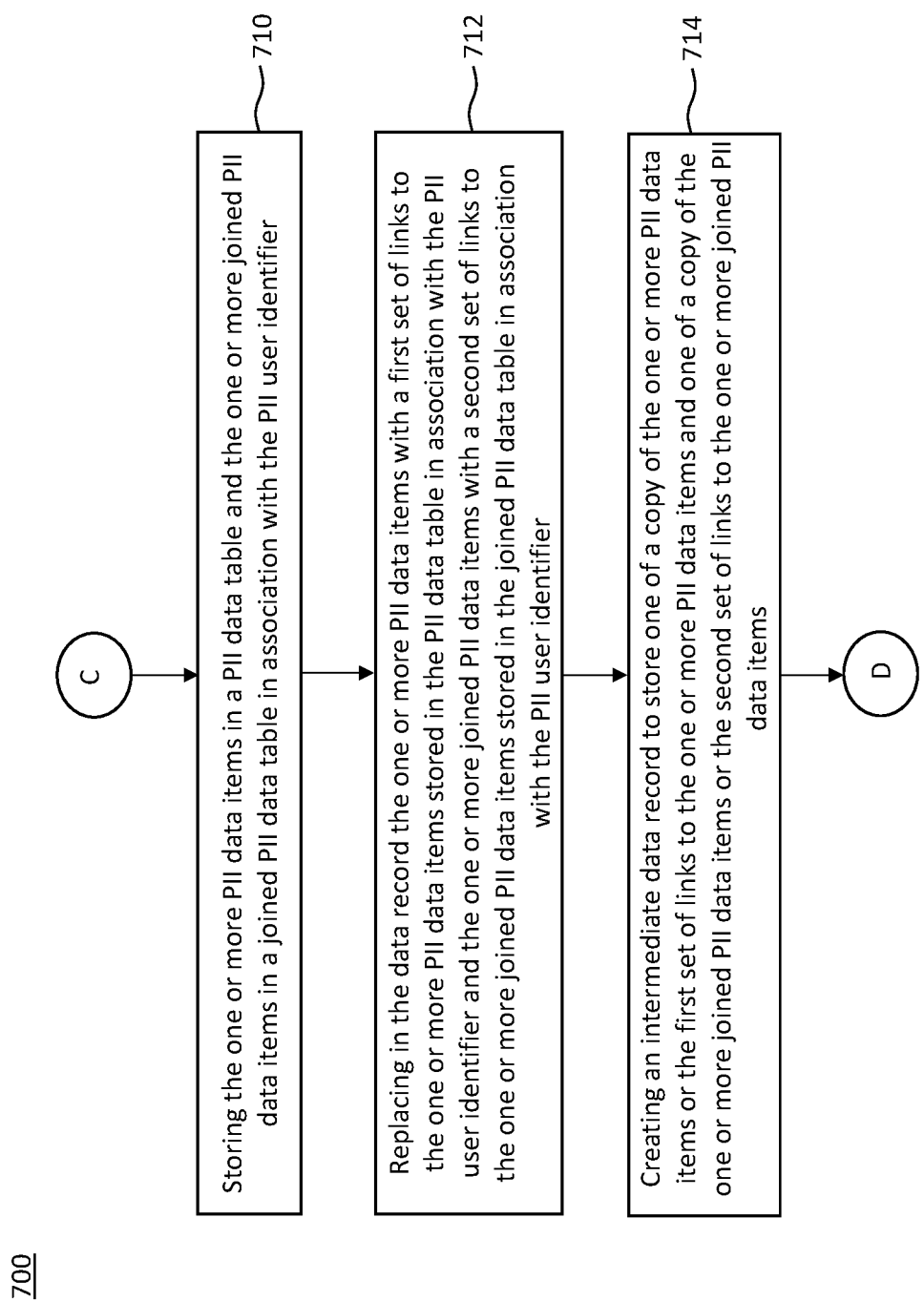
Figure 7C:
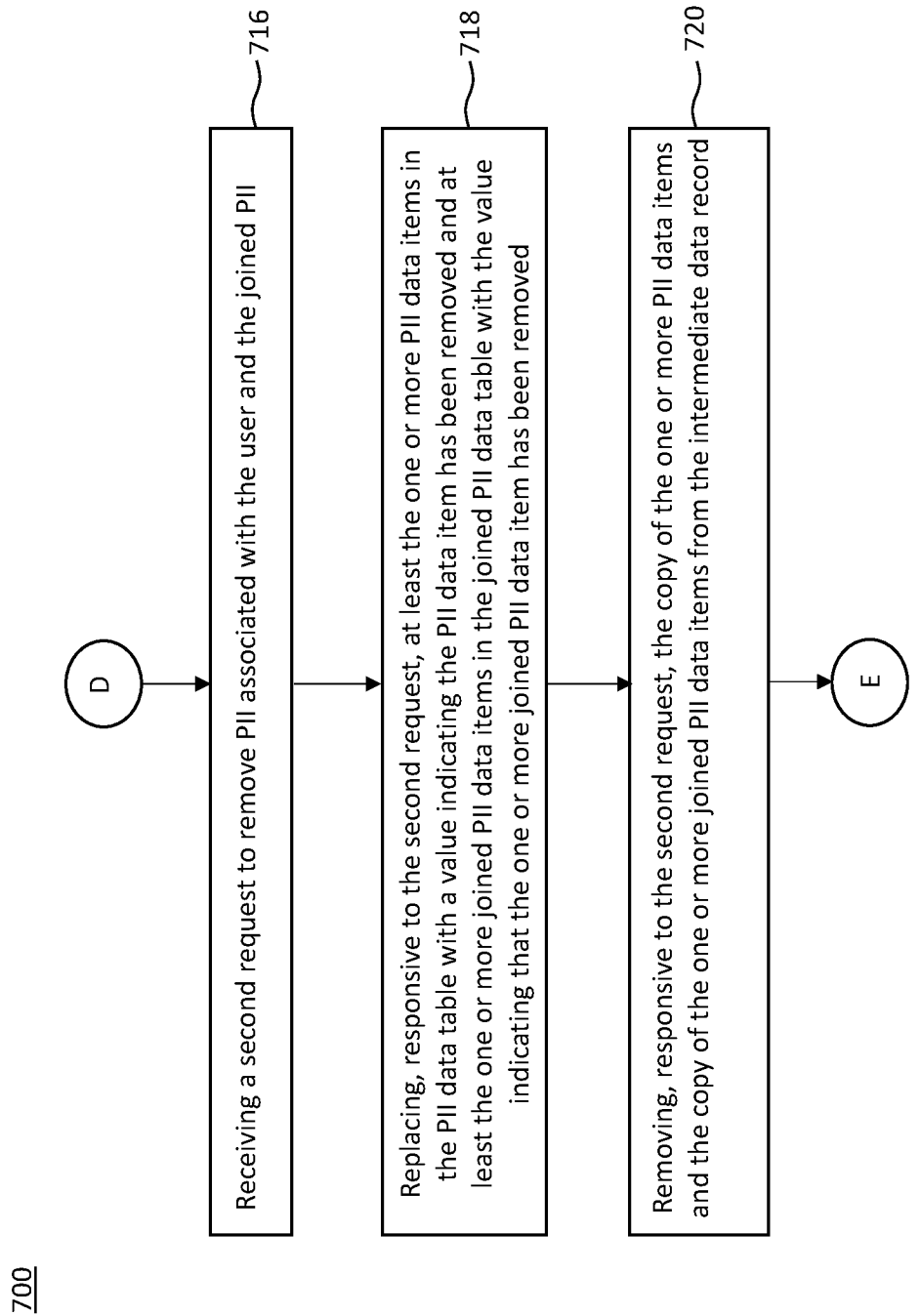
Figure 7D:
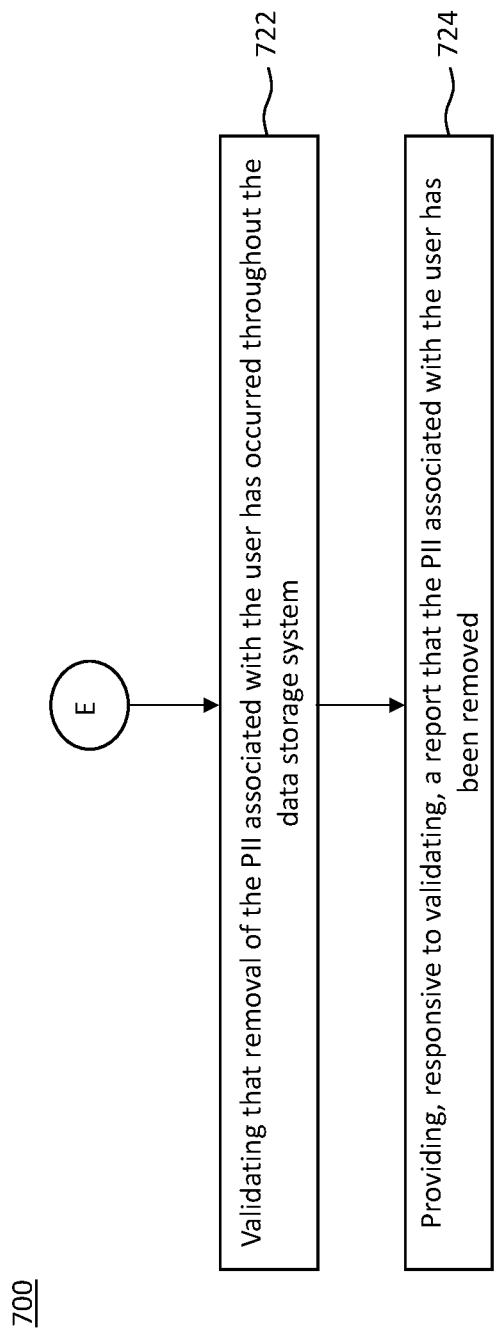

FIG. 6A, FIG. 6B, and FIG. 6C depict flowchart 600 for efficiently storing and removing personally identifiable information (PII) in data storage system 204, according to one or more embodiments.

In a brief overview of an implementation of flowchart 600, at step 602, a request to store data to one or more data records in data storage system 204 may be received. In examples, the data includes one or more data items of PII of a user, joined PII, and non-PII. At step 604, the one or more PII data items, the one or more joined PII data items, and the one or more non-PII data items are stored to a data record of the one or more data records. At step 606, it may be identified that the data record has the one or more PII, one or more joined PII and one, or more non-PII data items within the data. At step 608, a PII user identifier for the user may be generated. At step 610, the one or more PII data items in the data record may be replaced with a first set of links to the one or more PII data items stored in a PII data table in association with the PII user identifier. Further, the one or more joined PII data items in the data record may be replaced with a second set of links to the one or more joined PII data items stored in a joined PII data table in association with the PII user identifier. At step 612, a second request may be received to remove PII associated with the user. At step 614, at least the one or more PII data items in the PII data table may be replaced with a value indicating the PII data item has been removed. At step 616, it may be validated that removal of the PII associated with the user has occurred throughout data storage system 204. At step 618, responsive to validating, a report that the PII associated with the user has been removed may be provided.

Step 602 includes receiving a request to store data to one or more data records in data storage system 204. In an example, the data includes one or more data items of PII of a user, joined PII, and non-PII. The data storage system 204 may comprise a data lake. According to an implementation, data analysis agent 226 may be configured to receive a request to store data to one or more data records in data storage system 204. In examples, the one or more joined PII data items are data items which in combination with other data items become PII.

Step 604 includes storing the one or more PII data items, the one or more joined PII data items, and the one or more non-PII data items to a data record of the one or more data records. According to an implementation, data analysis agent 226 may be configured to store the one or more PII data items, the one or more joined PII data items, and the one or more non-PII data items to a data record of the one or more data records. According to an implementation, PII data table 308 may be configured to store the one or more PII data items, and joined PII data table 310 may be configured to store the one or more joined PII data items.

Step 606 includes identifying that the data record has the one or more PII, one or more joined PII and one or more non-PII data items within the data. According to an implementation, data analysis agent 226 may be configured to identify that the data record has the one or more PII, one or more joined PII and one or more non-PII data items within the data.

Step 608 includes generating a PII user identifier for the user. According to an implementation, data analysis agent 226 may be configured to generate the PII user identifier for the user. In some implementations, data analysis agent 226 may be configured to store the one or more PII data items in a PII data table in association with the PII user identifier, and the one or more joined PII data items in a joined PII data table in association with the PII user identifier.

Step 610 includes replacing in the data record the one or more PII data items with a first set of links to the one or more PII data items stored in the PII data table in association with the PII user identifier and the one or more joined PII data items with a second set of links to the one or more joined PII data items stored in the joined PII data table in association with the PII user identifier. According to an implementation, removal and validation agent 230 may be configured to replace in the data record the one or more PII data items with a first set of links to the one or more PII data items stored in the PII data table in association with the PII user identifier and the one or more joined PII data items with a second set of links to the one or more joined PII data items stored in the joined PII data table in association with the PII user identifier. In examples, the PII data table and the joined PII data table are included in a single table associated with the PII user identifier.

Step 612 includes receiving a second request to remove PII associated with the user. According to an implementation, removal and validation agent 230 may be configured to receive the second request to remove PII associated with the user.

Step 614 includes replacing at least the one or more PII data items in the PII data table with a value indicating the PII data item has been removed. According to an implementation, removal and validation agent 230 may be configured to replace at least the one or more PII data items in the PII data table with a value indicating the PII data item has been removed. In some implementations, removal and validation agent 230 may be configured to replace, responsive to the second request, the one or more joined PII data items in the joined PII data table with the value indicating that the one or more joined PII data item has been removed. In examples, the value may include a string that identifies details of the removal of the PII.

Step 616 includes validating that removal of the PII associated with the user has occurred throughout data storage system 204. According to an implementation, removal and validation agent 230 may be configured to validate that removal of the PII associated with the user has occurred throughout data storage system 204.

Step 618 includes providing, responsive to validating, a report that the PII associated with the user has been removed. According to an implementation, removal and validation agent 230 may be configured to validate the report that the PII associated with the user has been removed.

FIG. 7A, FIG. 7B, FIG. 7C, and FIG. 7D depict another flowchart 700 for efficiently storing and removing personally identifiable information (PII) in data storage system 204, according to one or more embodiments.

In a brief overview of an implementation of flowchart 700, at step 702, a request to store data to one or more data records in data storage system 204 may be received. In examples, the data includes one or more data items of PII of a user, joined PII, and non-PII. At step 704, the one or more PII data items, the one or more joined PII data items, and the one or more non-PII data items are stored to a data record of the one or more data records. At step 706, it may be identified that the data record has the one or more PII, one or more joined PII and one, or more non-PII data items within the data. At step 708, a PII user identifier for the user may be generated. At step 710, the one or more PII data items are stored in a PII data table and the one or more joined PII data items are stored in a joined PII data table in association with the PII user identifier. At step 712, the one or more PII data items may be replaced with a first set of links to the one or more PII data items stored in the PII data table in association with the PII user identifier and the one or more joined PII data items may be replaced with a second set of links to the one or more joined PII data items stored in the joined PII data table in association with the PII user identifier. At step 714, an intermediate data record is created to store one of a copy of the one or more PII data items or the first set of links to the one or more PII data items and one of a copy of the one or more joined PII data items or the second set of links to the one or more joined PII data items. At step 716, a second request may be received to remove PII associated with the user. At step 718, responsive to the second request, at least the one or more PII data items in the PII data table may be replaced with a value indicating the PII data item has been removed and at least the one or more joined PII data items in the joined PII data table may be replaced with the value indicating that the one or more joined PII data item has been removed. At step 720, responsive to the second request, the copy of the one or more PII data items and the copy of the one or more joined PII data items may be removed from the intermediate data record. At step 722, it may be validated that removal of the PII associated with the user has occurred throughout data storage system 204. At step 724, responsive to validating, a report that the PII associated with the user has been removed may be provided.

Step 702 includes receiving a request to store data to one or more data records in data storage system 204. In an example, the data includes one or more data items of PII of a user, joined PII, and non-PII. The data storage system 204 may compromise a data lake. According to an implementation, data analysis agent 226 may be configured to receive a request to store data to one or more data records in data storage system 204. In examples, the one or more joined PII data items are data items which in combination with other data items become PII.

Step 704 includes storing the one or more PII data items, the one or more joined PII data items, and the one or more non-PII data items to a data record of the one or more data records. According to an implementation, data analysis agent 226 may be configured to store the one or more PII data items, the one or more joined PII data items, and the one or more non-PII data items to a data record of the one or more data records. According to an implementation, PII data table 308 may be configured to store the one or more PII data items, and joined PII data table 310 may be configured to store the one or more joined PII data items.

Step 706 includes identifying that the data record has the one or more PII, one or more joined PII and one or more non-PII data items within the data. According to an implementation, data analysis agent 226 may be configured to identify that the data record has the one or more PII, one or more joined PII and one or more non-PII data items within the data.

Step 708 includes generating a PII user identifier for the user. According to an implementation, data analysis agent 226 may be configured to generate the PII user identifier for the user.

Step 710 includes storing the one or more PII data items in a PII data table and the one or more joined PII data items in a joined PII data table in association with the PII user identifier. According to an implementation, data analysis agent 226 may be configured to store the one or more PII data items in the PII data table and the one or more joined PII data items in the joined PII data table in association with the PII user identifier. In examples, the PII data table and the joined PII data table are included in a single table associated with the PII user identifier.

Step 712 includes replacing in the data record the one or more PII data items with a first set of links to the one or more PII data items stored in the PII data table in association with the PII user identifier and the one or more joined PII data items with a second set of links to the one or more joined PII data items stored in the joined PII data table in association with the PII user identifier. According to an implementation, removal and validation agent 230 may be configured to replace in the data record the one or more PII data items with a first set of links to the one or more PII data items stored in the PII data table in association with the PII user identifier and the one or more joined PII data items with a second set of links to the one or more joined PII data items stored in the joined PII data table in association with the PII user identifier.

Step 714 includes creating an intermediate data record to store one of a copy of the one or more PII data items or the first set of links to the one or more PII data items and one of a copy of the one or more joined PII data items or the second set of links to the one or more joined PII data items. According to an implementation, intermediate data processing agent 228 may be configured to create the intermediate data record to store one of a copy of the one or more PII data items or the first set of links to the one or more PII data items and one of a copy of the one or more joined PII data items or the second set of links to the one or more joined PII data items.

Step 716 includes receiving a second request to remove PII associated with the user and the joined PII. According to an implementation, removal and validation agent 230 may be configured to receive the second request to remove PII associated with the user and the joined PII.

Step 718 includes replacing, responsive to the second request, at least the one or more PII data items in the PII data table with a value indicating the PII data item has been removed and at least the one or more joined PII data items in the joined PII data table with the value indicating that the one or more joined PII data item has been removed. According to an implementation, removal and validation agent 230 may be configured to replace, responsive to the second request, at least the one or more PII data items in the PII data table with a value indicating the PII data item has been removed and at least the one or more joined PII data items in the joined PII data table with the value indicating that the one or more joined PII data item has been removed. In examples, the value may include a string that identifies details of the removal of the PII.

Step 720 includes removing, responsive to the second request, the copy of the one or more PII data items and the copy of the one or more joined PII data items from the intermediate data record. According to an implementation, removal and validation agent 230 may be configured to remove, responsive to the second request, the copy of the one or more PII data items and the copy of the one or more joined PII data items from the intermediate data record.

Step 722 includes validating that removal of the PII associated with the user has occurred throughout data storage system 204. According to an implementation, removal and validation agent 230 may be configured to validate that removal of the PII associated with the user has occurred throughout data storage system 204.

Step 724 includes providing, responsive to validating, a report that the PII associated with the user has been removed. According to an implementation, removal and validation agent 230 may be configured to validate the report that the PII associated with the user has been removed.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for more efficiently storing and removing personally identifiable information (PII) in a data storage system, the method comprising:
   receiving, by one or more devices, a request to store data to one or more data records in a data storage system, the data comprising one or more data items of PII of a user, joined PII and non-PII;
   storing, by the one or more devices, the one or more PII data items, the one or more joined PII data items and the one or more non-PII data items to a data record of the one or more data records;
   identifying, by an agent of the one or more devices, that the data record has the one or more PII, one or more joined PII and one or more non-PII data items within the data;
   generating, by the one or more devices, a PII user identifier for the user;
   replacing, by the one or more devices, in the data record the one or more PII data items with a first set of links to the one or more PII data items stored in a PII data table in association with the PII user identifier and the one or more joined PII data items with a second set of links to the one or more joined PII data items stored in a joined PII data table in association with the PII user identifier;
   receiving, by the one or more devices, a second request to remove PII associated with the user;
   replacing, by the one or more devices, at least the one or more PII data items in the PII data table with a value indicating the PII data item has been removed;
   validating, by a removal and validation agent, that removal of the PII associated with the user has occurred throughout the data storage system; and
   providing, by the removal and validation agent responsive to validating, a report that the PII associated with the user has been removed.

2. The method of claim 1, wherein the PII data table and the joined PII data table are included in a single table associated with the PII user identifier.

3. The method of claim 1, further comprising replacing, by the one or more devices responsive to the second request, the one or more joined PII data items in the joined PII data table with the value indicating that the one or more joined PII data item has been removed.

4. The method of claim 1, further comprising storing, by the one or more devices, the one or more PII data items in the PII data table in association with the PII user identifier.

5. The method of claim 1, further comprising storing, by the one or more devices, the one or more joined PII data items in the joined PII data table in association with the PII user identifier.

6. The method of claim 1, wherein the one or more joined PII data items are data items which in combination with other data items become PII.

7. The method of claim 1, wherein the data storage system comprises a data lake.

8. The method of claim 1, wherein the value comprises a string that identifies details of the removal of the PII.

9. The method of claim 1, further creating, by the one or more devices, an intermediate data record to store one of a copy of the one or more PII data items or the first set of links to the one or more PII data items and one of a copy of the one or more joined PII data items or the second set of links to the one or more joined PII data items.

10. The method of claim 9, further comprising removing, by the or more devices responsive to the second request, the copy of the one or more PII data items and the copy of the one or more joined PII data items from the intermediate data record.

11. A system for more efficiently storing and removing personally identifiable information (PII) in a data storage system, the system comprising:
one or more devices configured to:
receive a request to store data to one or more data records in a data storage system, the data comprising one or more data items of PII of a user, joined PII and non-PII;
store the one or more PII data items, the one or more joined PII data items and the one or more non-PII data items to a data record of the one or more data records;
cause an agent to determine that the data record has the one or more PII, one or more joined PII and one or more non-PII data items within the data;
generate a PII user identifier for the user;
replace in the data record the one or more PII data items with a first set of links to the one or more PII data items stored in a PII data table in association with the PII user identifier and the one or more joined PII data items with a second set of links to the one or more joined PII data items stored in a joined PII data table in association with the PII user identifier;
receive a second request to remove PII associated with the user;
replace at least the one or more PII data items in the PII data table with a value indicating the PII data item has been removed; and
cause a removal and validation agent to validate that removal of the PII associated with the user has occurred throughout the data storage system and provide a report that the PII associated with the user has been removed.

12. The system of claim 11, wherein the PII data table and the joined PII data table are included in a single table associated with the PII user identifier.

13. The system of claim 11, wherein the one or more devices are further configured to replace, responsive to the second request, the one or more joined PII data items in the joined PII data table with the value indicating that the one or more joined PII data item has been removed.

14. The system of claim 11, wherein the one or more devices are further configured to store the one or more PII data items in the PII data table in association with the PII user identifier.

15. The system of claim 11, wherein the one or more devices are further configured to store the one or more joined PII data items in the joined PII data table in association with the PII user identifier.

16. The system of claim 11, wherein the one or more joined PII data items are data items which in combination with other data items become PII.

17. The system of claim 11, wherein the data storage systems comprises a data lake.

18. The system of claim 11, wherein the value comprises a string that identifies details of the removal of the PII.

19. The system of claim 11, wherein the one or more devices are further configured to create an intermediate data record to store one of a copy of the one or more PII data items or the first set of links to the one or more PII data items and one of a copy of the one or more joined PII data items or the second set of links to the one or more joined PII data items.

20. The system of claim 19, wherein the one or more devices are further configured to remove, responsive to the second request, the copy of the one or more PII data items and the copy of the one or more joined PII data items from the intermediate data record.

* * * * *